US008739219B2

(12) United States Patent
Walter et al.

(10) Patent No.: US 8,739,219 B2
(45) Date of Patent: *May 27, 2014

(54) SYSTEM AND METHOD FOR PROVIDING A UNIFIED PROGRAMMING GUIDE

(75) Inventors: Edward Walter, Boerne, TX (US); Scott White, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 129 days.

This patent is subject to a terminal disclaimer.

(21) Appl. No.: 13/408,083

(22) Filed: Feb. 29, 2012

(65) Prior Publication Data
US 2012/0159551 A1 Jun. 21, 2012

Related U.S. Application Data

(63) Continuation of application No. 11/225,857, filed on Sep. 13, 2005, now Pat. No. 8,156,527.

(51) Int. Cl.
*G06F 3/00* (2006.01)
*G06F 13/00* (2006.01)
*H04N 5/445* (2011.01)

(52) U.S. Cl.
USPC .......... 725/45; 725/37; 725/44; 725/47; 725/48; 725/59

(58) Field of Classification Search
None
See application file for complete search history.

(56) References Cited

U.S. PATENT DOCUMENTS

| | | | |
|---|---|---|---|
| 5,635,989 A | 6/1997 | Rothmuller | |
| 5,694,176 A | 12/1997 | Bruette et al. | |
| 5,914,746 A | 6/1999 | Matthews, III et al. | |
| 6,005,631 A | 12/1999 | Anderson et al. | |
| 6,175,362 B1 | 1/2001 | Harms et al. | |
| 6,182,287 B1 | 1/2001 | Schneidewend et al. | |
| 6,285,414 B1 | 9/2001 | Chilamakuri | |
| 6,317,883 B2 | 11/2001 | Marics | |
| 6,529,680 B1 | 3/2003 | Broberg | |

(Continued)

FOREIGN PATENT DOCUMENTS

| | | |
|---|---|---|
| EP | 1763235 A2 | 3/2007 |
| GB | 2377578 A | 1/2003 |
| WO | 0027117 A1 | 5/2000 |
| WO | 0167317 A1 | 9/2001 |

OTHER PUBLICATIONS

Non-Final Office Action for U.S. Appl. No. 11/225,857 received from the United States Patent and Trademark Office (USPTO) mailed Jun. 26, 2008, 17 pages.

(Continued)

*Primary Examiner* — Justin Shepard
(74) *Attorney, Agent, or Firm* — Toler Law Group, PC

(57) ABSTRACT

A method includes receiving data associated with a plurality of multimedia channels. The data includes a multimedia channel numbering set. The method includes presenting the data at a display device communicatively coupled to the set-top box device via an electronic programming guide that includes an option to customize the electronic programming guide by genre. The method includes receiving a selection of one or more genres and a particular multimedia content source. The method includes automatically replacing the multimedia channel numbering set with a renumbered multimedia channel numbering set. Multimedia channels that are associated with the one or more selected genres and that are associated with the particular multimedia content source are assigned a lower channel number in the renumbered multimedia channel numbering set than other multimedia channels that are associated with the one or more selected genres and that are associated with other multimedia content sources.

20 Claims, 18 Drawing Sheets

(56) References Cited

U.S. PATENT DOCUMENTS

| | | |
|---|---|---|
| 6,631,523 B1 | 10/2003 | Matthews, III et al. |
| 6,707,508 B1 | 3/2004 | Mears et al. |
| 6,732,372 B2 | 5/2004 | Tomita et al. |
| 6,757,691 B1 | 6/2004 | Welsh et al. |
| 6,798,912 B2 | 9/2004 | Devara |
| 6,865,246 B2 | 3/2005 | Yang |
| 8,095,954 B2 | 1/2012 | Walter et al. |
| 2002/0053084 A1 | 5/2002 | Escobar et al. |
| 2002/0078457 A1 | 6/2002 | Nishikawa et al. |
| 2002/0083451 A1 | 6/2002 | Gill et al. |
| 2002/0144289 A1 | 10/2002 | Taguchi et al. |
| 2002/0188946 A1 | 12/2002 | Kohne |
| 2002/0188952 A1 | 12/2002 | Istvan et al. |
| 2003/0070170 A1 | 4/2003 | Lennon |
| 2003/0093795 A1 | 5/2003 | Takahashi et al. |
| 2004/0019907 A1 | 1/2004 | Li et al. |
| 2004/0034867 A1 | 2/2004 | Rashkovskiy et al. |
| 2004/0049787 A1 | 3/2004 | Maissel et al. |
| 2005/0108754 A1 | 5/2005 | Carhart et al. |
| 2006/0041923 A1 | 2/2006 | McQuaide, Jr. |
| 2006/0048184 A1 | 3/2006 | Poslinski et al. |
| 2006/0117342 A1 | 6/2006 | Park et al. |
| 2006/0123076 A1 | 6/2006 | Raiyat |
| 2006/0150214 A1 | 7/2006 | Ramraz et al. |
| 2006/0259927 A1 | 11/2006 | Acharya et al. |
| 2009/0307726 A1 | 12/2009 | Levin et al. |

OTHER PUBLICATIONS

Non-Final Office Action for U.S. Appl. No. 11/225,857 received from the United States Patent and Trademark Office (USPTO) mailed Dec. 1, 2008, 17 pages.

Final Office Action for U.S. Appl. No. 11/225,857 received from the United States Patent and Trademark Office (USPTO) mailed Apr. 22, 2009, 26 pages.

Non-Final Office Action for U.S. Appl. No. 11/225,857 received from the United States Patent and Trademark Office (USPTO) mailed Sep. 14, 2009, 35 pages.

Final Office Action for U.S. Appl. No. 11/225,857 received from the United States Patent and Trademark Office (USPTO) mailed Mar. 16, 2010, 43 pages.

Non-Final Office Action for U.S. Appl. No. 11/225,857 received from the United States Patent and Trademark Office (USPTO) mailed Nov. 1, 2010, 58 pages.

Final Office Action for U.S. Appl. No. 11/225,857 received from the United States Patent and Trademark Office (USPTO) mailed Apr. 13, 2011, 60 pages.

Advisory Action for U.S. Appl. No. 11/225,857 received from the United States Patent and Trademark Office (USPTO) mailed Aug. 15, 2011 23 pages.

Notice of Allowance and Fee(s) Due for U.S. Appl. No. 11/225,857 received from the United States Patent and Trademark Office (USPTO) mailed Aug. 25, 2011, 46 pages.

Notice of Allowance and Fee(s) Due for U.S. Appl. No. 11/225,857 received from the United States Patent and Trademark Office (USPTO) mailed Dec. 1, 2011, 50 pages.

Non-Final Office Action for U.S. Appl. No. 11/225,403 received from the United States Patent and Trademark Office (USPTO) mailed Jun. 20, 2008, 26 pages.

Non-Final Office Action for U.S. Appl. No. 11/225,403 received from the United States Patent and Trademark Office (USPTO) mailed Oct. 28, 2008, 23 pages.

Final Office Action for U.S. Appl. No. 11/225,403 received from the United States Patent and Trademark Office (USPTO) mailed Mar. 26, 2009, 25 pages.

Non-Final Office Action for U.S. Appl. No. 11/225,403 received from the United States Patent and Trademark Office (USPTO) mailed Jul. 8, 2009, 30 pages.

Final Office Action for U.S. Appl. No. 11/225,403 received from the United States Patent and Trademark Office (USPTO) mailed Nov. 24, 2009, 39 pages.

Non-Final Office Action for U.S. Appl. No. 11/225,403 received from the United States Patent and Trademark Office (USPTO) mailed Mar. 11, 2010, 37 pages.

Final Office Action for U.S. Appl. No. 11/225,403 received from the United States Patent and Trademark Office (USPTO) mailed Aug. 30, 2010, 58 pages.

Non-Final Office Action for U.S. Appl. No. 11/225,403 received from the United States Patent and Trademark Office (USPTO) mailed May 4, 2011, 49 pages.

Notice of Allowance and Fee(s) Due for U.S. Appl. No. 11/225,403 received from the United States Patent and Trademark Office (USPTO) mailed Sep. 13, 2011, 46 pages.

European Search Report and Opinion for European Application No. EP 06254228.7-1522/1763235 dated Dated Dec. 30, 2008, 4 pages.

SYSTEM AND METHOD FOR PROVIDING A UNIFIED PROGRAMMING GUIDE

CLAIM OF PRIORITY

The present application claims priority from and is a continuation of U.S. patent application Ser. No. 11/225,857, filed Sep. 13, 2005 and entitled "System and Method for Providing a Unified Programming Guide," the contents of which are expressly incorporated by reference herein.

CROSS-REFERENCE TO RELATED APPLICATIONS

The present application is related to U.S. patent application Ser. No. 11/225,403, now U.S. Pat. No. 8,095,954, filed on Sep. 13, 2005 and entitled "System and Method for Providing Custom Channel Arrangements in a Programming Guide," assigned to the current assignee hereof, the entirety of which is incorporated by reference herein.

FIELD OF THE DISCLOSURE

The present disclosure is generally related to multimedia content distribution and reception.

BACKGROUND

Multimedia content providers frequently provide program guides, such as electronic programming guides (EPGs), to subscribers to facilitate navigation among a large number of available multimedia channels (e.g., broadcast/cable television channels, packet-based network streaming radio and video channels, and the like). Many multimedia content providers also provide the ability to set up customized lists (e.g., "favorites" lists) that represent a subset of the available multimedia channels that has been preferentially identified by a user. A customized list typically allows a user to quickly navigate among the user's favorite channels at a display device. However, these customized lists do not facilitate the navigation of a larger set of the multimedia channels by a user in an efficient manner.

Accordingly improved techniques for navigating among multimedia channels would be advantageous.

DETAILED DESCRIPTION

Figure 1:
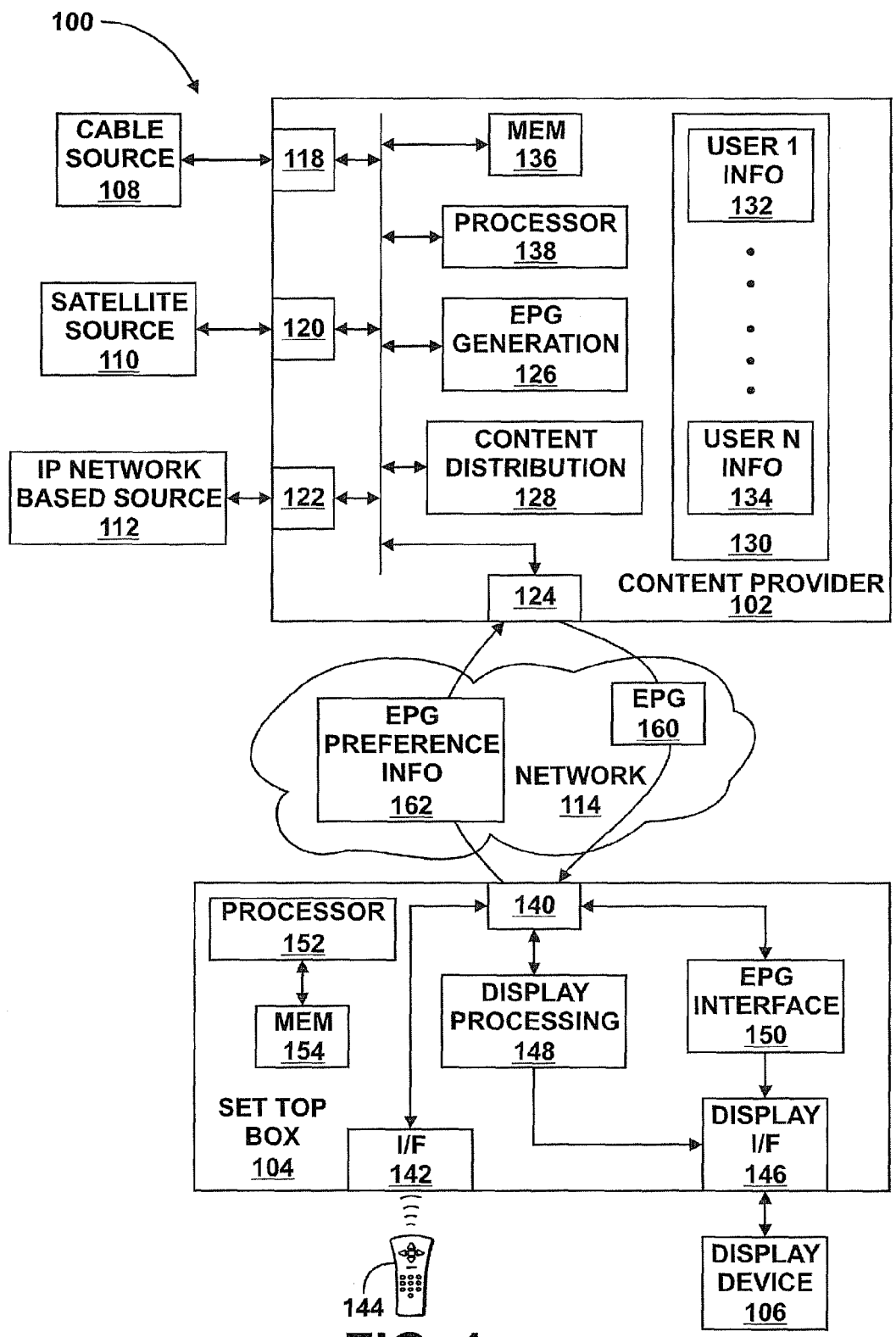
FIG. 1 is a block diagram illustrating an exemplary system for distributing an electronic programming guide (EPG) to select multimedia channels from a plurality of content sources in accordance with at least one embodiment of the present disclosure.

In accordance with one aspect of the present disclosure, a method is provided. The method includes receiving data representative of a plurality of multimedia channels and associating channel numbers with at least a subset of the plurality of multimedia channels to generate a first channel numbering set. In one embodiment, the first channel numbering set is based on user preference information. The method further includes providing, in response to user input indicating a selection of a channel number of the first channel numbering set, data representative of one of the plurality of multimedia channels for display.

In accordance with another aspect of the present disclosure, the method includes receiving a set of first channel numbering information associated with a first user and receiving a set of second channel numbering information associated with a second user. In one embodiment, the set of second channel numbering information is different than the set of first channel numbering information. The method further includes providing data representative of a first plurality of multimedia channels arranged based on the set of first channel numbering information to the first user. The method also includes providing data representative of a second plurality of multimedia channels arranged based on the set of second channel numbering information to the second user.

In one embodiment, the first plurality of multimedia channels includes at least a first subset of a third plurality of multimedia channels and wherein the second plurality of multimedia channels includes at least a second subset of a third plurality of the multimedia channels. The first subset can be the same as the second subset. The first channel numbering information can be provided to a content provider via a set top box. In this instance, the set of first channel numbering information can be based on input received from a user via an electronic programming guide interface of the set top box.

In a particular embodiment, the set of first channel numbering information represents channel numbering preferences of the first user and the set of second channel numbering information represents channel numbering preferences of the second user. The channel numbering preferences of the first user can include a preferred arrangement of the first plurality of multimedia channels and the channel numbering preferences of the second user include a preferred arrangement of the second plurality of multimedia channels. In one embodiment, the channel numbering preferences of at least one of the first user or the second user are based on programming content.

In accordance with another aspect of the present disclosure, a computer readable medium is provided. The computer readable medium embodies a set of executable instructions to manipulate a processor to receive data representative of a plurality of multimedia channels and associate channel numbers with at least a subset of the plurality of multimedia channels to generate a first channel numbering set. The set of executable instructions further manipulates the processor to provide, in response to user input indicating a selection of a channel number of the first channel numbering set, data representative of one of the plurality of multimedia channels for display.

In accordance with yet another aspect of the present disclosure, the set of executable instructions manipulate a processor to display an electronic programming guide interface at a display device. The electronic programming guide interface includes a user input interface to receive user information indicating a preferred arrangement of a plurality of multimedia channels ordered in a channel numbering set. The set of executable instructions further manipulate the processor to provide, in response to user input indicating a selection of a channel number by a user, one of the plurality of multimedia channels for display at the display device based on the channel numbering set.

In accordance with an additional aspect of the present disclosure, a system is provided. The system includes a processor and memory coupled to the processor to store a set of executable instructions. The set of executable instructions manipulates the processor to receive, at a first set-top box, data representative of a plurality of multimedia channels. In one embodiment, the plurality of multimedia channels is associated with a first sequence of channel numbers. The set of executable instructions also manipulates the processor to generate a second sequence of channel numbers associated with at least a subset of the plurality of multimedia channels, wherein the second sequence of channel numbers is determined based on user preference information. The set of executable instructions further manipulates the processor to provide data representative of one of the plurality of multimedia channels in response to a selection of one of the second sequence of channel numbers.

In accordance with another aspect of the present disclosure, the system includes a channel numbering module to provide a channel numbering sequence associated with a plurality of multimedia channels. In one embodiment, the channel numbering sequence is based on user preference information. The system further includes a control interface to receive user input indicating a selection of a first channel number and a channel selector module to select a multimedia channel from the plurality of multimedia channels based on the first channel number and the channel numbering sequence.

Referring to FIG. 1, an exemplary multimedia distribution system 100 is illustrated in accordance with at least one embodiment of the present disclosure. As shown, the system 100 includes a multimedia content provider 102, a set top box 104, a display device 106, and a plurality of multimedia content sources, such as cable television source 108, satellite television source 110, a IP network-based source 112, an over the air (OTA) source (e.g., broadcast or terrestrial), and the like. In the illustrated embodiment, the content provider 102 and the set top box 104 are connected via a network 114, where the network 114 can include a cable television distribution network, a satellite distribution network, a broadcast television distribution network, a data packet-based computer network (e.g., an Ethernet network), and the like. Likewise, the content sources 108, 110, and 112 may be connected via one or more networks to the content provider 102.

As shown, the content provider 102 can include one or more interfaces 118, 120, and 122 to interface with the content sources 108, 110, and 112, respectively, and an interface 124 to interface with the set top box 104 via the network 114. The interfaces 118, 120, 122, and 124 may include any of a variety of interfaces, such as a coaxial cable interface, a wireless interface for receiving satellite or broadcast transmissions, or a data packet network interface, such as an Ethernet interface. The content provider 102 further may include an EPG generation module 126, a multimedia content distribution module 128, and a user preference storage module 130 for storing user preference information, such as user preference information 132 associated with a first user and user preference information 134 associated with an Nth user. The modules 126, 128, and 130 may be implemented as software, hardware, firmware, or combinations thereof. To illustrate, the content provider 102 can include a memory 136 (e.g., static random access memory (SRAM)) and one or more processors 138, where the modules 126 and 128 may be implemented in part or in whole as executable instructions stored in the memory 136 and executed by the processor 138 to perform the techniques described herein. Moreover, the user preference storage module 130 may be implemented and stored at memory 136.

As also shown, the set top box 104 may include an interface 140 for interfacing with the content provider 102 via the network 114, a control interface 142 to receive user input and commands via, e.g., a remote control 144 or a button panel, and a display interface 146 to interface with the display device 106. The interface 140 can include any of a variety of appropriate interfaces, such as a coaxial cable interface, a wireless interface to send and receive wireless transmissions, or a data packet-based network interface, such as an Ethernet interface. The control interface 142 may include any of a variety of user interfaces, such as an infrared interface, a wireless interface, or a button panel. The set top box 104 further can include a display processing module 148 and an EPG interface module 150. The modules 148 and 150 can be implemented as hardware, software, firmware, or combinations thereof. To illustrate, the set top box 104 may include a memory 154 and one or more processors 152, where one or both of modules 148 and 150 are implemented as executable instructions stored in memory 154 and executed by the processor 152 to implement techniques described herein.

In a particular embodiment, the content provider 102 receives data representative of multimedia channels from each of the different content sources 108, 110, and 112, and provides data representative of at least a subset of the multimedia channels to the set top box 104 for processing and display at the display device 106 and/or output via an audio device (not shown). Moreover, in a particular embodiment, the content provider 102 provides data representative of an EPG 160 to the set top box 104 for processing by the display processing module 148 and for navigation by a user via the control interface 142 and the EPG interface module 150. As described herein, the EPG 160, in one embodiment, represents a unified EPG including listings for the multimedia channels provided by two or more content sources that provide multimedia channels to the content provider 102. To illustrate, in a particular embodiment, the EPG 160 represents a navigable program guide whereby a user, via the remote control 144 or other input device, can direct the EPG interface module 150 to navigate between multimedia channels by selecting an icon or other graphical representation of the desired channel as represented by a graphical display of the EPG 160. The EPG 160 may combine representations of all of the multimedia channels from different content sources in a single list or different lists for different content sources may be displayed concurrently by the EPG 160. Moreover, multimedia channels may be organized within the EPG 160 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

In a particular embodiment, a user may provide user preference information that represents user preferences regarding channel ordering arrangements, genre selection, EPG display characteristics, (e.g., color, font size, spatial arrangement, etc.), as well as source address information for packet-based network content sources. The source address information can include an IP address, a hypertext transfer protocol (HTTP) address, and the like.

As shown in FIG. 1, the set top box 104 can provide some or all of the user preference information as EPG preference information 162 to the content provider 102. In response, the content provider 102 can store the EPG preference information 162 as user information in the user information storage module 130. Further, the content provider 102 can modify one or more characteristics of the EPG 160 based on the EPG preference information 162. For example, the EPG 160 can be arranged in accordance with user preferences indicating a particular spatial arrangement of graphical representations in the EPG 160 or arranged in accordance with preferred channel ordering arrangements provided by the EPG preference information 162. As a result, a user can customize the EPG 160 so as to provide an enhanced EPG for navigating among available multimedia channels.

Figure 2:
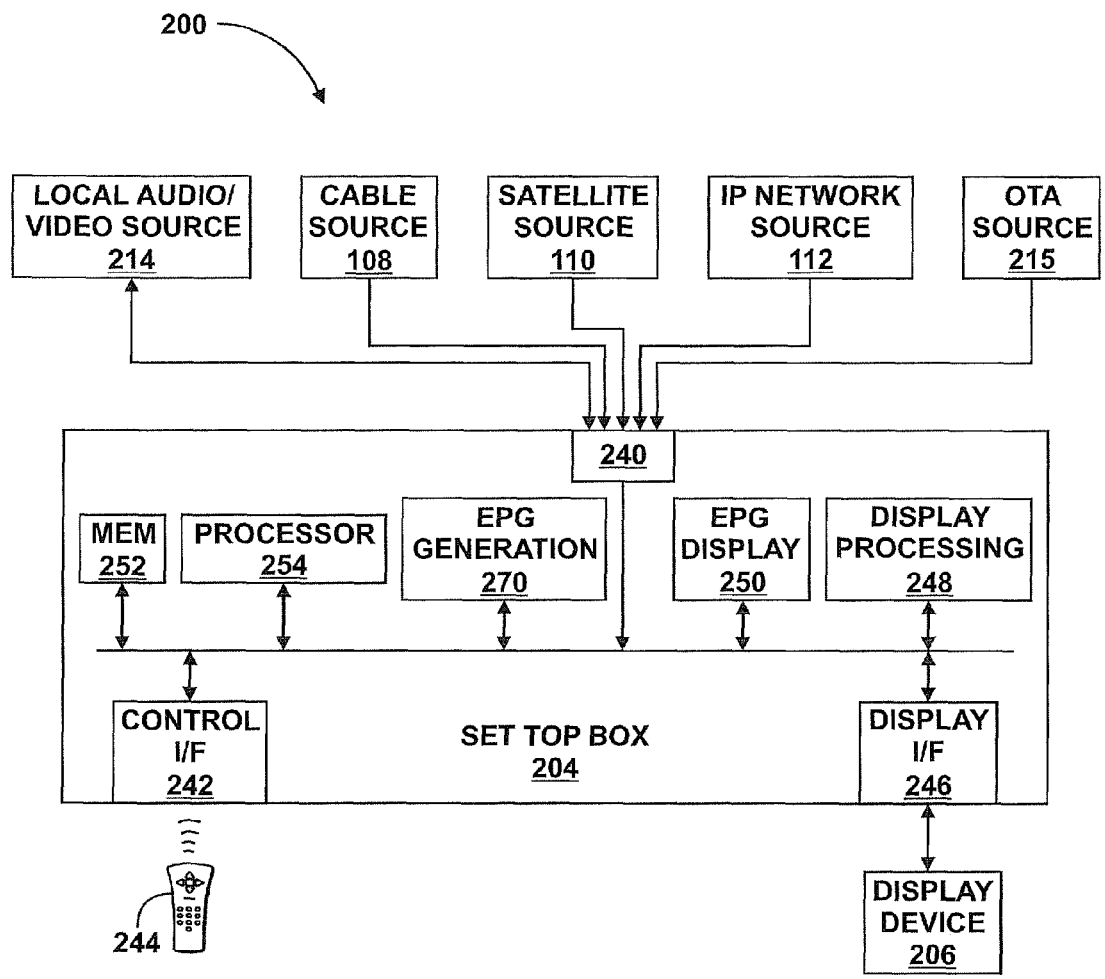
FIG. 2 is a block diagram illustrating an exemplary set top box for providing an EPG to select multimedia channels from a plurality of content sources in accordance with at least one embodiment of the present disclosure.

Referring to FIG. 2, a set top box-based system 200 for providing a custom EPG to navigate multimedia channels from a plurality of content sources is illustrated in accordance with at least one embodiment of the present disclosure. As shown, the system 200 includes a set top box 204, a display device 206, and a plurality of content sources, such as cable television source 108, satellite television source 110, IP network-based multimedia source 112, a local audio/video source 214 (e.g., a networked surveillance camera or a networked intercom), an OTA source 215 (e.g., broadcast or terrestrial), and the like.

In a particular embodiment, the set top box 204 includes one or more content source interfaces 240 to receive data representative of one or more multimedia channels from a plurality of content sources, such as the content sources 108, 110, 112, 214, and 215. The set top box 204 further may include a control interface 242 to receive control input from a user via a remote control 244 or other input device and a display interface 246 to interface with the display device 206.

The set top box 204 further may include a display processing module 248, an EPG display module 250, and an EPG generation module 270. The modules 248, 250 and 270 may be implemented as hardware, software, or firmware, or combinations thereof. For example, one or more of the modules 248, 250, and 270 may be implemented as executable instructions stored in a memory device 252 of the set top box 204 and executed by one or more processors 254 to perform one or more techniques described herein.

In a particular embodiment, the EPG generation module 270 receives user preference information via the control interface 242 and generates a custom EPG based on the user preference information. The custom EPG, in one embodiment, represents a listing or other arrangement of one or more multimedia channels of one or more of the content sources that provide multimedia channel data to the set top box 204. Data representative of the generated EPG is provided to the EPG display module 250, which formats the data for display (e.g., as an EPG interface or other GUI) on the display device 206. The processed data is provided to the display processing module 248 for further processing and formatting and then provided to the display interface 246 for provision to the display device 206.

Further, in a particular embodiment, the EPG display module 250 receives, via the control interface 242, user input that is representative of a user's navigation of the displayed EPG. The user input may include an indication of the user's selection of a graphical representation associated with a particular multimedia channel. In response, the EPG display module 250 may provide a signal to the display processing module 248 indicating a selection of the selected multimedia channel. The display processing module 248 then processes data associated with a selected multimedia channel for display on the display device 206. The user input further can include input representing the addition of one or more channels to the EPG generated by the EPG generation module 270, deletion of one or more channels from the EPG, or information associated with one or more multimedia channels of the EPG. For example, a user may manipulate the remote control 244 to provide network address information associated with a multimedia data stream provided by the IP network-based multimedia source 112. The network address information can include an IP address or HTTP address of, e.g., a streaming multimedia channel. The user input further may include information regarding a preferred numbering of multimedia channels within the EPG generated by the EPG generation module 270. In response to the user input, the EPG display module 250 directs the EPG generation module 270 to modify the EPG as indicated by the user input.

Figure 3:
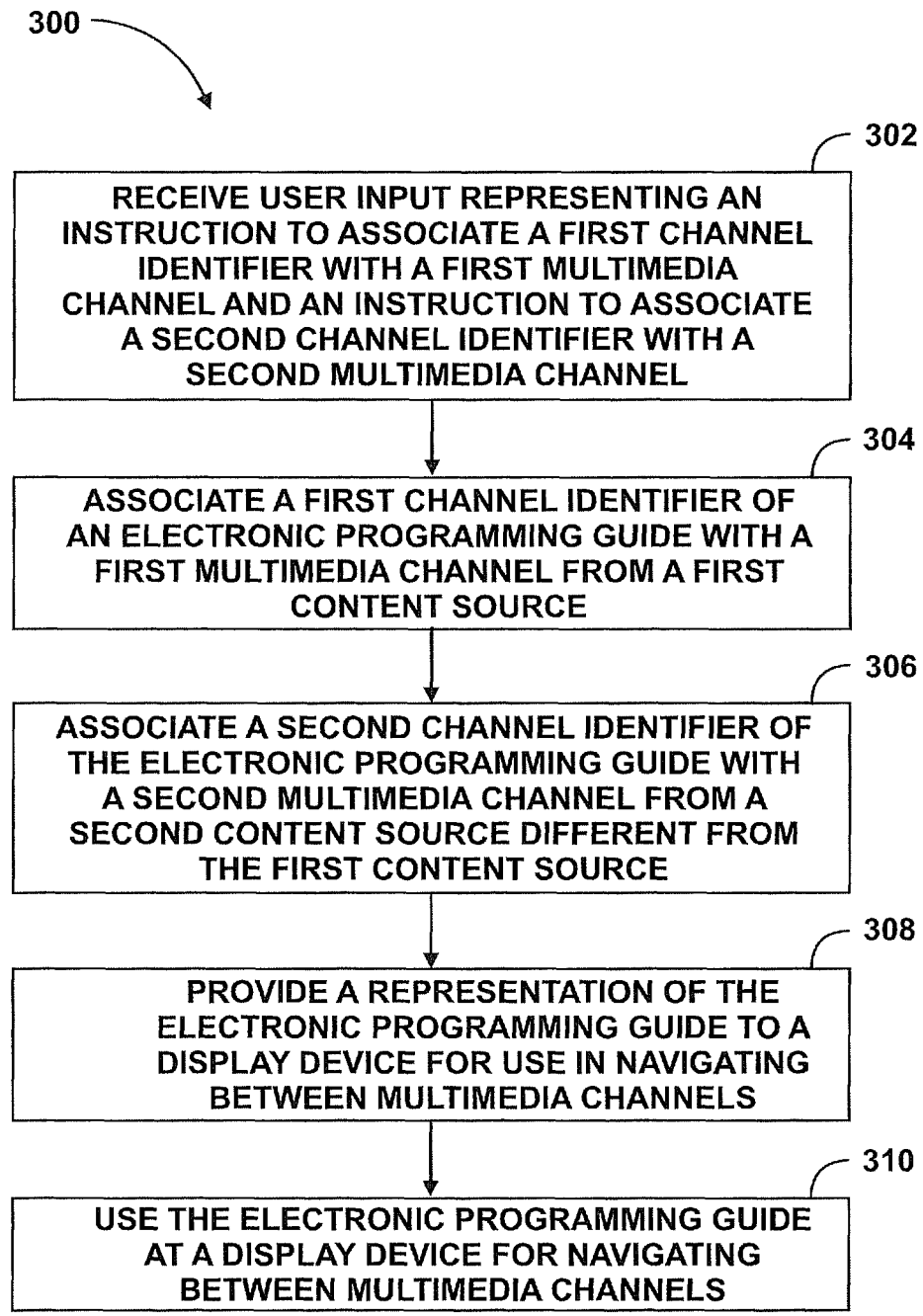
FIGS. 3 and 4 are flow diagrams illustrating exemplary methods for providing an EPG for use with multimedia channels from a plurality of content sources in accordance with at least one embodiment of the present disclosure.

Referring to FIG. 3, an exemplary method 300 for generating or modifying an EPG to reference multimedia channels from a plurality of content sources is illustrated. The method 300 includes receiving user input representing an instruction to associate the first channel identifier with a first multimedia channel and an instruction to associate a second channel identifier with a second multimedia channel at block 302. In instances where the EPG is created or modified by a content provider (e.g., content provider 102, FIG. 1), the user input may be received at a set top box (e.g., set top box 104, FIG. 1) and then forwarded to the content provider via a network. In instances where the EPG is created or modified by a set top box (e.g., set top box 204, FIG. 2), the user input may be received via a control interface of the set top box (e.g., control interface 242, FIG. 2). The user input can represent a user selection of a graphical representation of a first channel identifier and its association with the first multimedia channel via a GUI displayed by a display device viewed by the user. In a particular embodiment, the first content source can include a cable television transmission, a satellite television transmission, a packet-based network transmission (e.g., a streaming multimedia channel), a local video feed, or a local audio feed, etc. In instances where the first content source includes a packet-based network source (e.g., a packetized multimedia stream provided by a web server associated with a particular IP address), the user input may represent a network address associated with the first multimedia channel (e.g., an IP address or an HTTP address).

The method 300 further includes associating the first channel identifier of the EPG with the first multimedia channel from the first content source at block 304. The first channel identifier may be associated with the first multimedia channel in any of a variety of ways. For example, the EPG can include, or be represented by, a data structure that has an entry for each channel identifier and an associated entry that identifies the associated multimedia channel. Accordingly, to associate a multimedia channel with a particular channel identifier, a pointer or other representation of the multimedia channel may be inserted into the entry corresponding to the particular channel identifier. Those skilled in the art may implement other techniques for associating channel identifiers with multimedia channels without departing from the scope of the present disclosure.

The method 300 further includes associating the second channel identifier of the EPG with the second multimedia channel from the second content source at block 306. The method 300 additionally includes providing a representation of the EPG to a display device for use in navigating between multimedia channels at block 308. The representation may include graphics data and interface control information utilized by a set top box (e.g., set top box 204, FIG. 2) for use in displaying a graphical representation of the EPG and for use in receiving user input with regard to the displayed graphical representation. The method 300 further includes using the EPG at the display device to navigate between the multimedia channels at block 310. As discussed, a user may provide user input via a remote control to a set top box and an EPG display interface module can interpret the user input and modify the operation of the set top box accordingly. For example, the user input may represent a selection of a particular channel identifier displayed as a graphical representation of the EPG. In this instance, the user input may be utilized by the set top box to select the multimedia channel associated with the selected channel identifier for display on a display device.

Figure 4:
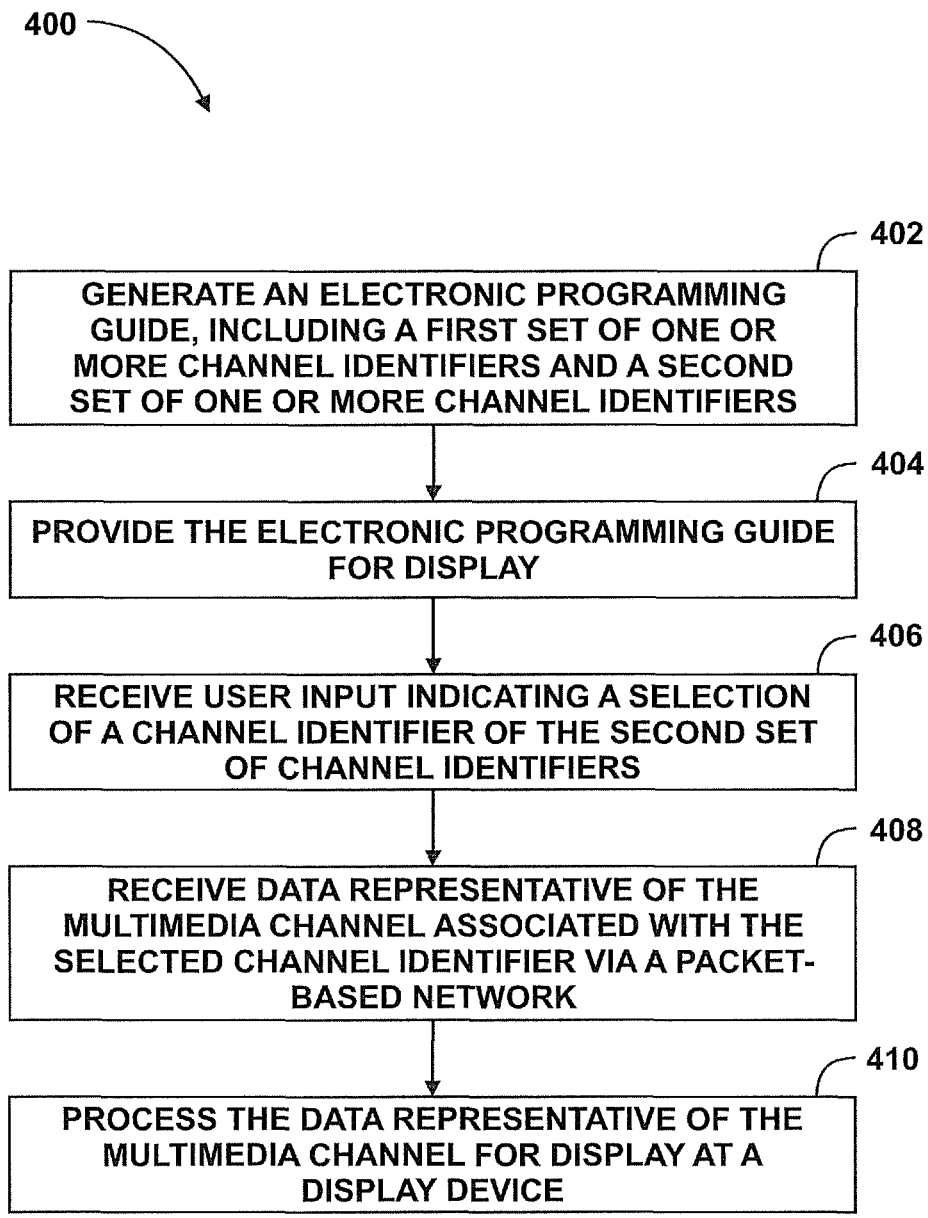

Referring to FIG. 4, an exemplary method 400 for generating an EPG is illustrated in accordance with at least one embodiment of the present disclosure. At block 402, the method 400 includes generating an EPG including a first set of one or more channel identifiers. Each channel identifier is associated with one or more multimedia channels of a cable television transmission. The EPG further includes a second set of one or more channel identifiers, where each channel identifier of the second set is associated with a multimedia channel from a packet-based network transmission. In a particular embodiment, the EPG further includes a third set of one or more channel identifiers, where each channel identifier of the third set is associated with a local video feed or a local audio feed. In one embodiment, the multimedia channels associated with the first set of channel identifiers and the multimedia channels associated with the second set of channel identifiers are determined based on user preference information. The user preference information can include a user-defined channel ordering arrangement, a user-defined grouping of channels, information indicating preferred channels, and the like. The first and second sets of channel identifiers can include channel numbers that may be displayed as graphical representations during a display of the EPG.

The method 400 further includes providing the EPG for display at block 404. In a particular embodiment, data representative of the EPG is provided to a set top box associated with a display device. The data representative of the EPG can be provided via, e.g., a packet-based network, such as an Ethernet network. Upon receipt of the EPG, the set top box can process the data representing the EPG for display as a GUI. A user of the display device then can navigate between channels by providing input with reference to the GUI, or the user may modify the EPG based on user input provided via a control interface of the set top box.

Accordingly, the method 400 further includes receiving user input indicating selection of a channel identifier of the second set of channel identifiers at block 406. At block 408, the method 400 includes receiving data representative of the multimedia channel associated with the selected channel identifier via a packet-based network. The method 400 additionally includes processing the data representative of the multimedia channel for display at a display device at block 410.

Figure 5:
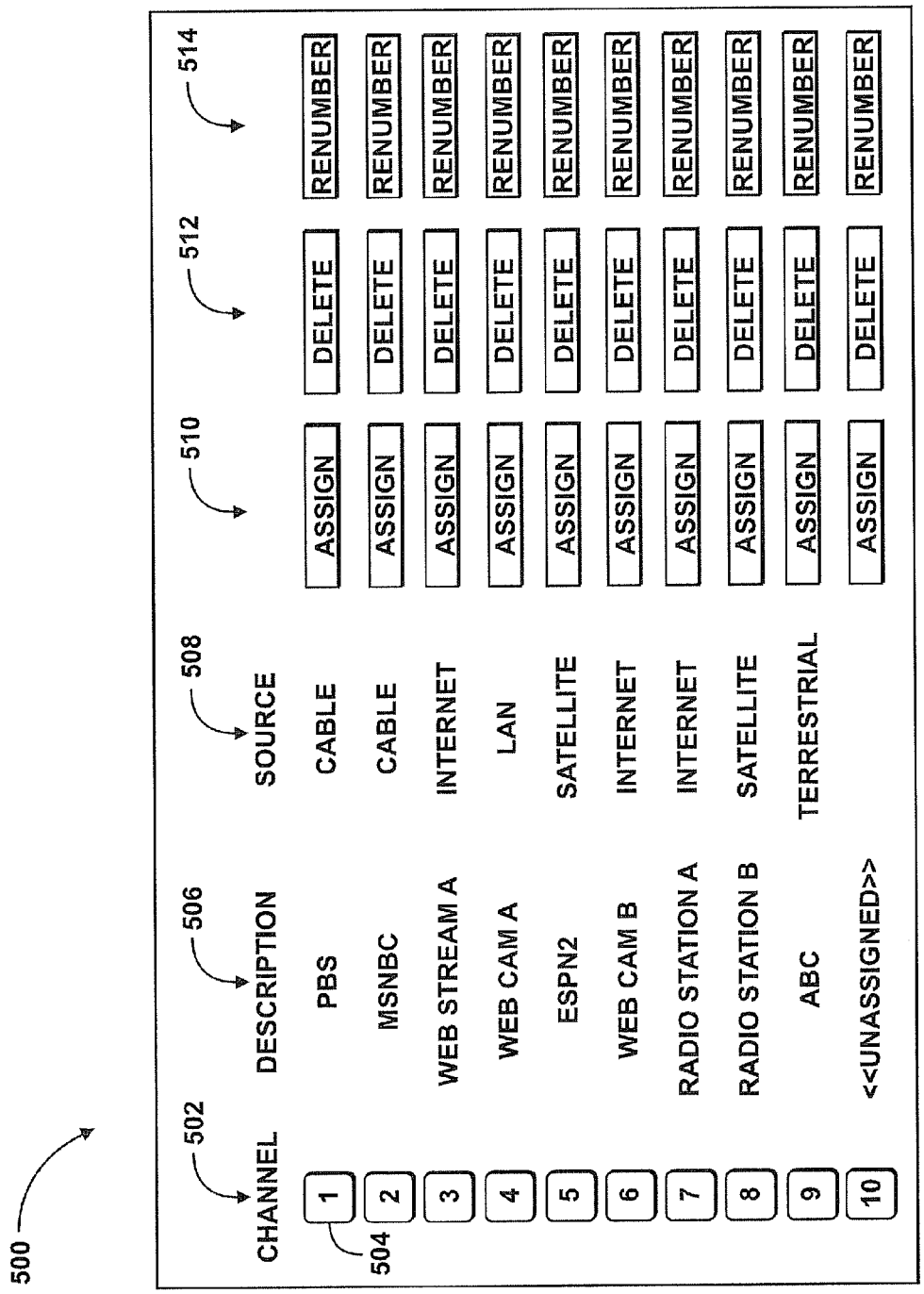
FIG. 5 is a general diagram illustrating an exemplary EPG interface in accordance with at least one embodiment of the present disclosure.

Referring to FIG. 5, an exemplary graphical representation 500 of an EPG is illustrated. As shown, the graphical representation 500 of the EPG can include a listing of multimedia channels available for display at a display device and/or output at an audio device. The channel listing can include a listing of channel identifiers 502, where the channel identifiers can include channel numbers or other identifiers that uniquely identify different multimedia channels. In one embodiment, the channel identifiers are represented by graphical representations 504 (e.g., a selectable button or other icon that displays a channel number). The channel listing further may include a description field 506 that provides a description of the corresponding multimedia channel. The description may include call letters or a name frequently associated with the multimedia channel. The description field 506 also may include a description of the type of multimedia channel. For example, if the multimedia channel is received as a video stream from a local surveillance video camera, the data stream may be identified as, e.g., a "web cam". Likewise, an audio stream representing radio program content received via a network streaming transmission may be identified as, e.g., a "radio station" channel. The channel listing may further include a source descriptor field 508 providing an indication of the source of the associated channel. As shown, the sources may be identified as cable, local area network (LAN), satellite, terrestrial, etc.

The graphical representation 500 may further include one or more user-selectable icons used to modify the EPG. To illustrate, the graphical representation 500 may include an assign icon 510 associated with each listed channel, where a user may select the assign icon 510 add a multimedia channel to the EPG by associating a particular multimedia channel with the indicated channel identifier or vice versa. Similarly, a delete icon 512 associated with each channel identifier may be selected by a user to remove the listed channel from the EPG. Additionally, in a particular embodiment, a renumber icon 514 may be selected by a user to renumber a particular channel so that it is associated with a different channel identifier. As FIG. 5 illustrates, a plurality of content sources may be accessed using a single EPG so that a user may easily navigate between multimedia channels from different content sources without resorting to accessing different EPGs for each of the different content sources.

Figure 6:
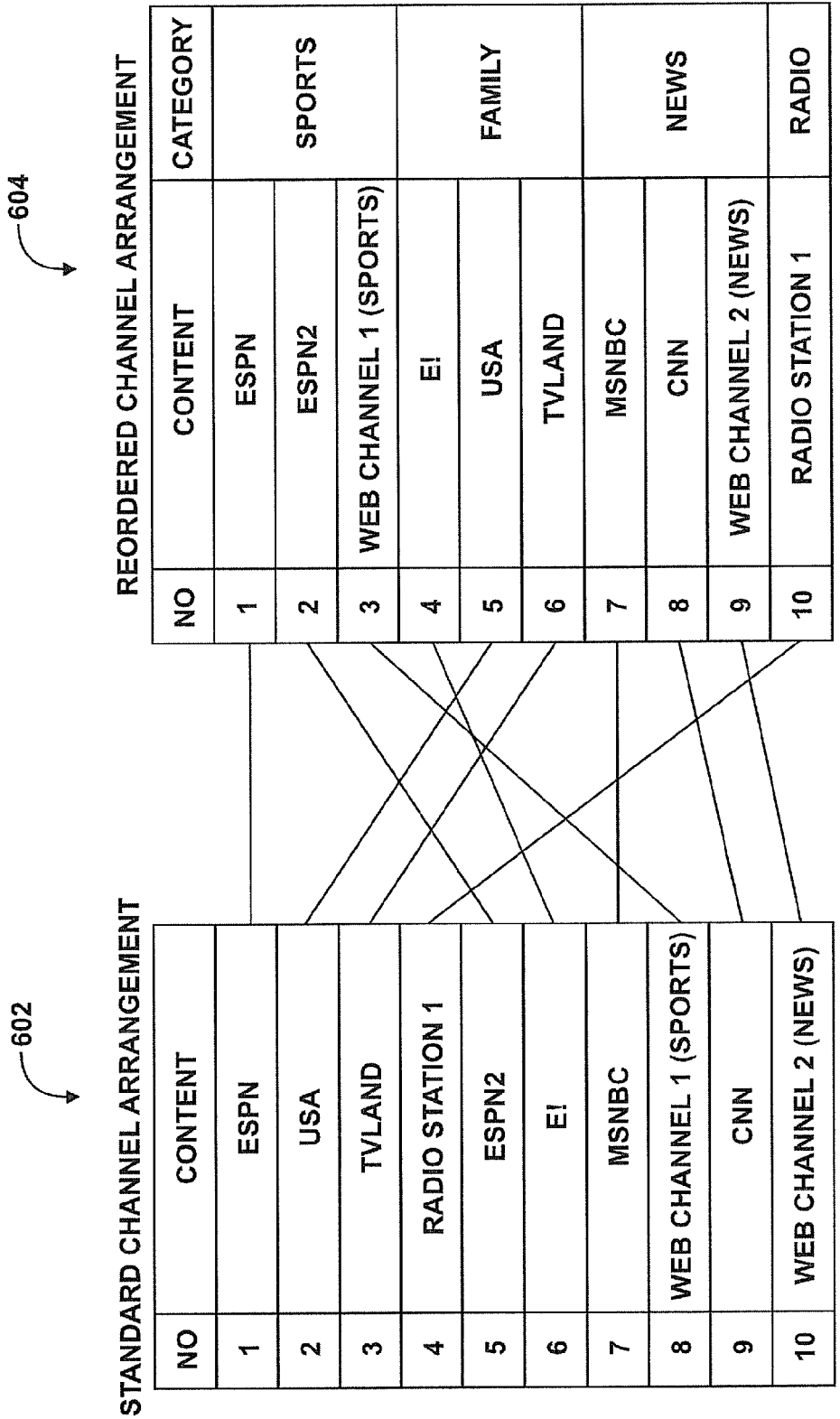
FIG. 6 is a general diagram illustrating an exemplary reordered channel arrangement based on user preference in accordance with at least one embodiment of the present disclosure.

Referring to FIG. 6, an exemplary reordering of multimedia channels represented in an EPG is illustrated. FIG. 6 illustrates two channel ordering arrangements, a standard, or predefined, channel ordering arrangement 602 and a reordered channel arrangement 604. The standard channel arrangement 602 represents the arrangement of multimedia channels with particular channel numbers that are standardized or predefined by a content provider, such as a cable television provider, a satellite television provider and the like.

The standard channel arrangement 602 represents an arrangement of multimedia channels based on general or broad characteristics, such as the arrangement of channels based on whether they are local channels, nationwide channels or premium channels, based on overall viewing preferences by the general viewing population or Nielsen ratings, and the like. However, due to its generalized or broad nature, the standard channel arrangement 602 may not provide a desired navigation arrangement for a particular user having particular preferences. To illustrate, a user may prefer certain channels with certain types of programming content, such as sports channels or news channels, to other channels. Moreover, a user may prefer to navigate through some or all the channels of a particular genre before navigating through channels of another genre. As another example, a user may prefer that the user's favorite channels be grouped together at lower channel numbers than the channel numbers associated with less favorite channels, which would then be grouped at higher channel numbers.

Accordingly, in a particular embodiment, the user preference information may be utilized to generate the reordered channel arrangement 604 whereby channels are arranged with respect to channel numbers or other channel identifiers so as to more accurately reflect a particular user's preferences. As shown in FIG. 6, a user may prefer that channels be grouped by genre and that certain genres be listed at lower channel numbers than other genres. For example, a user may prefer that sports-based multimedia channels be listed first, followed by multimedia channels appropriate for family viewing, which then are followed by news-based multimedia channels and radio-based multimedia channels. Accordingly, the user preference information can be used to generate the exemplary reordered channel arrangement 604 whereby sports channels are associated with channel numbers 1, 2, and 3, family-oriented multimedia channels are associated with channel numbers 4, 5, and 6, news-based multimedia channels are associated with channel numbers 7, 8, and 9, and a radio station channel is associated with channel number 10. Moreover, in a particular embodiment, the user may arrange the numbering of channels (or other ordering of channels) within a particular category or genre. To illustrate, a user may prefer that the multimedia channels identified as "ESPN" and "ESPN2" be numbered sequentially and that the "ESPN" channel be assigned a lower channel number than the channel number assigned to the "ESPN2" channel. As a result, a user may access the user's custom EPG via a set top box and more easily and more quickly navigate among multimedia channels available for display via a display device connected to the set top box.

Figure 7:
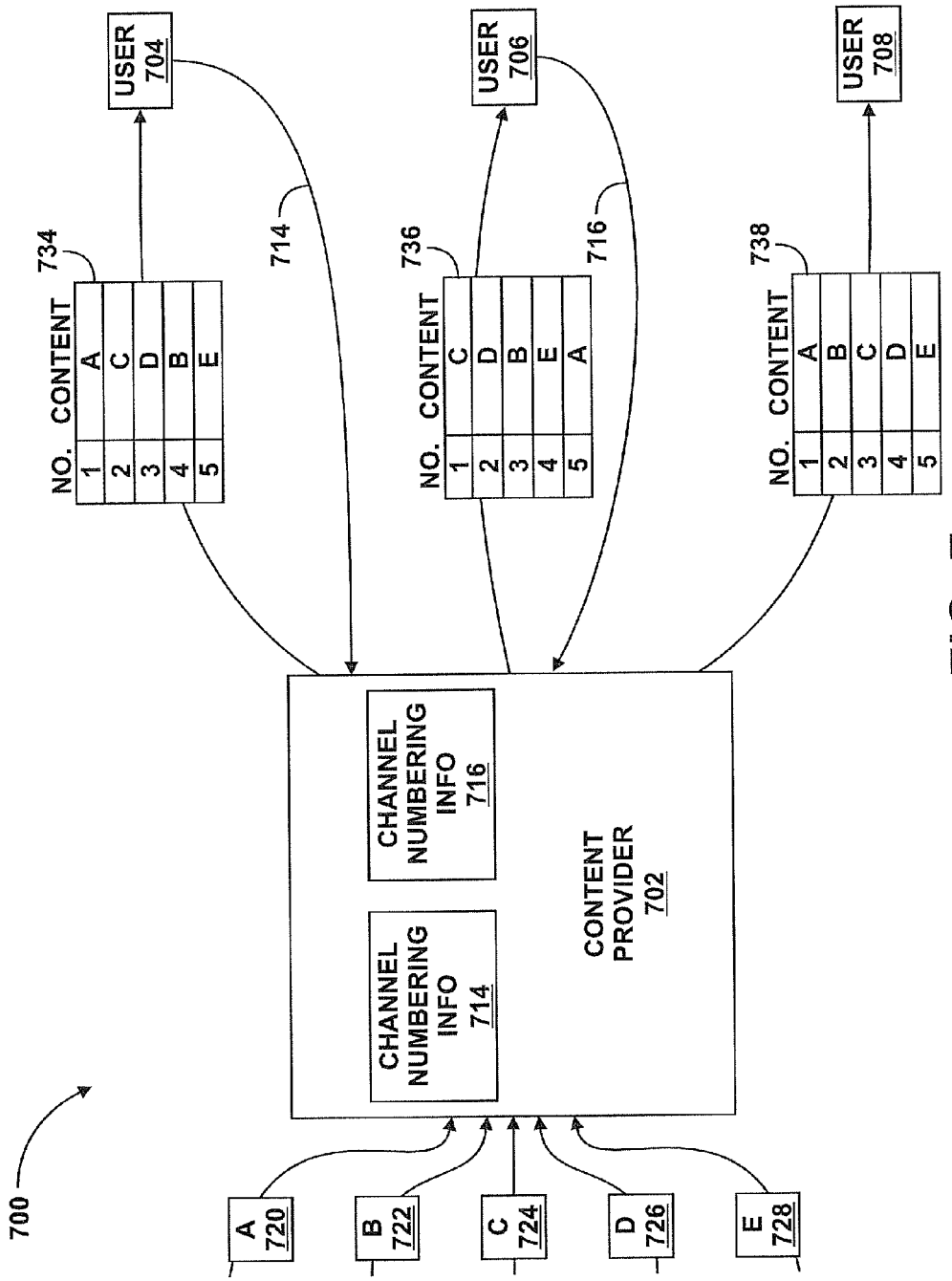
FIG. 7 is a block diagram illustrating an exemplary system for distributing an EPG having a reordered channel arrangement in accordance with at least one embodiment of the present disclosure.

Referring to FIG. 7, an exemplary system 700 for distributing custom EPGs having custom channel arrangements to one or more users is illustrated in accordance with at least one embodiment of the present disclosure. As shown, the system 700 can include a content provider 702 connected to one or more users 704, 706, and 708 via one or more networks, such as a cable television network, a satellite transmission network, or a data packet-based network. In the illustrated embodiment, users 704 and 706 provide user preference information to the content provider 702 in the form of channel numbering information 714 and 716, respectively. The channel numbering information 714 and 716 can include data representative of user preferences regarding the arrangement of channels, such as the association of particular channels with particular channel identifiers, a grouping of channels by genre, the addition and/or deletion of multimedia channels and the like.

In response, the content provider 702 stores the channel numbering information 714 and 716, generates custom EPGs implementing channel arrangements in accordance with the user preferences provided by the user 704 and 706, and provides these custom EPGs to the users 704 and 706. To illustrate, assume, for example, that content provider 702 receives multimedia channels 720, 722, 724, 726, and 728 (also labeled multimedia channels A-E, respectively) from one or more content sources. In response to the user preference information provided by users 704 and 706, the content provider 702 generates custom EPG 734 for distribution to the user 704 and custom EPG 736 for distribution to the user 706. As illustrated, the multimedia channels A-E may have a particular arrangement for the user 704 in accordance with the preferences of user 704, whereas the arrangement of channels A-E in the EPG 736 for user 706 may have a different arrangement based on the preferences indicated by user 706. Moreover, in a particular embodiment, the content provider 702 provides a standard EPG 738 to users, such as user 708, that have not indicated a preferred channel numbering or ordering arrangement.

Figure 8:
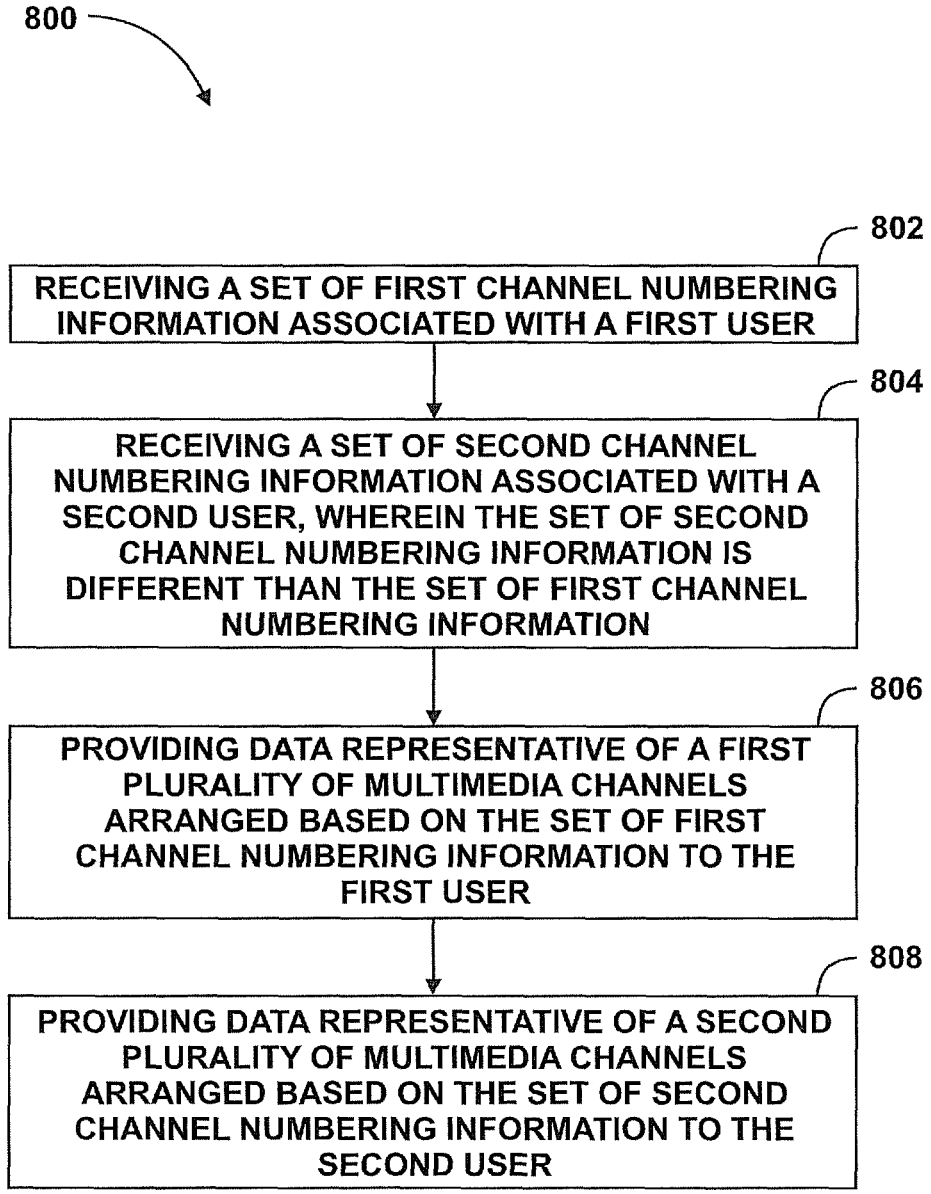
FIG. 8 is a flow diagram illustrating an exemplary method for providing an EPG having reordered channel numbering in accordance with at least one embodiment of the present disclosure.

Referring to FIG. 8, an exemplary method 800 for providing a customized channel ordering arrangement is illustrated in accordance with at least one embodiment of the present disclosure. The method 800 includes receiving a set of first channel numbering information associated with a first user at block 802. The method 800 further includes receiving a set of second channel numbering information associated with a second user at block 804, where the second channel numbering information is different than the set of first channel numbering information. In a particular embodiment, the set of first channel numbering information represents channel numbering preferences of the first user and the set of channel numbering information represents channel numbering preferences of the second user. The channel numbering preferences of the first user can include a preferred arrangement of the first plurality of multimedia channels. Likewise, the channel numbering preferences of the second user can include a preferred arrangement of the second plurality of multimedia channels. In one embodiment, the channel numbering preferences of one or both of the first user or second user can be based on programming content of the multimedia channels. For example, the channel numbering associated with different channels may be based on the genre of certain multimedia channels.

In a particular embodiment, the set of first channel numbering information and the set of second channel numbering information can be provided to the content provider via a set top box associated with each of the first and second users. In these instances, the channel numbering information can be based on inputs received from users via an EPG interface implemented at the set top box.

The method 800 further includes providing data representative of a first plurality of multimedia channels arranged based on the set of first channel numbering information to the first user at block 806. The method 800 additionally includes providing data representative of the second plurality of multimedia channels arranged based on the set of second channel numbering information to the second user at block 808. In a particular embodiment, the first plurality of multimedia channels includes at least a first subset of a third plurality of multimedia channels and the second plurality of multimedia channels includes at least a second subset of the third plurality of multimedia channels. The third plurality of multimedia channels may represent the multimedia channels received at a content provider from one or more content sources wherein the first and second plurality multimedia channels are selected from the plurality of multimedia channels received based on user preference information including the first and second sets of channel numbering information.

Figure 9:
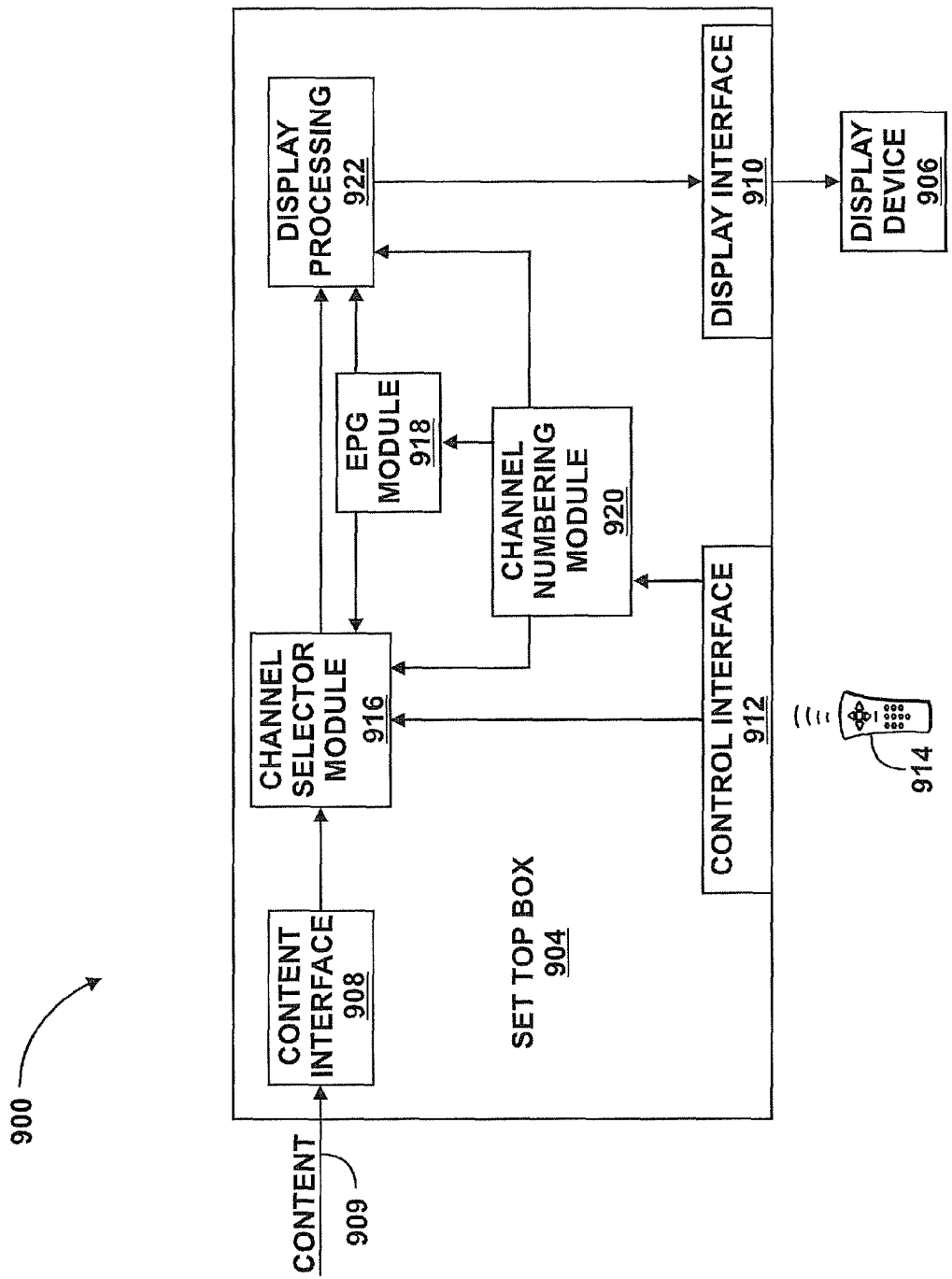
FIG. 9 is a block diagram illustrating an exemplary set top box for providing reordered multimedia channels in accordance with at least one embodiment of the present disclosure.

Referring to FIG. 9, an exemplary system 900 for providing a custom EPG having a custom channel arrangement is illustrated in accordance with at least one embodiment of the present disclosure. As shown, the system 900 includes a set top box 904 connected to a display device 906. The set top box 904 can include a content interface 908 to receive content data 909 representative of one or more multimedia channels from one or more content sources. The set top box 904 further may include a display interface 910 to interface with the display device 906 and a control interface 912 to receive user input via a remote control 914 or other input device. In a particular embodiment, the set top box 904 further includes a channel selector module 916, an EPG interface module 918, a channel numbering module 920, and a display processing module 922.

In a particular embodiment, the set top box 904 can receive user input representative of user preferences regarding the arrangement of particular multimedia channels with relation to certain channel identifiers, such as channel numbers. To illustrate, the control interface 912 may receive, via the remote control 914, user input representative of a user's preferences regarding the channel number arrangement of certain multimedia channels. In one embodiment, the user preference information is received and stored at the channel numbering module 920 and the channel numbering module 920 generates a channel numbering sequence associated with one or more multimedia channels received as content data 909 based on the user preference information. The channel numbering module 920 then may provide a representation of this channel numbering sequence to the EPG interface module 918 so that the EPG interface module 918 can modify one or more EPGs to reflect the new or updated channel numbering sequence. The modified EPG may be provided to the display processing module 922 for formatting as a GUI for display at the display device 906.

A user may navigate the GUI representing the modified EPG and select a particular channel number so as to direct the set top box 904 to provide the associated multimedia channel for display. The selection of a particular channel number for display may be initiated by user input via the control interface 912. User input, in one embodiment, could include a next channel input, a previous channel input or the selection of a specific channel number by the user. The control interface 912 can provide a signal representative of the selected channel number to the channel selector module 916. In response, the channel selector module 916 may select the multimedia channel associated with the selected channel number from the plurality of multimedia channels represented by the content data 909 using the channel numbering sequence provided by the channel numbering module 920 or using the modified EPG from the EPG interface module 918. The channel selector module 916 then may provide data associated with the identified multimedia channel to display processing module 922 for processing and output to the display device 906 via the display interface 910.

The display devices described herein can include any of a variety of devices capable of displaying video content and/or outputting audio content. For example, a display device can comprise a television, a computer monitor, a video-enabled mobile phone or personal digital assistant (PDA), a portable video player, and the like. In at least one embodiment, the set top boxes and the display devices discussed herein may be integrated as a single device. To illustrate, the set top box 104 and the display device 106 of FIG. 1, the set top box 204 and the display device 206 of FIG. 2, or the set top box 904 and the display device 906 of FIG. 9 may be integrated as one of the exemplary networked televisions described in U.S. patent application Ser. Nos. 11/166,909, 11/166,785, 11/166,908, and 11/166,907, each filed on Jul. 24, 2005, and each of which are incorporated by reference herein in their entirety.

Figure 10:
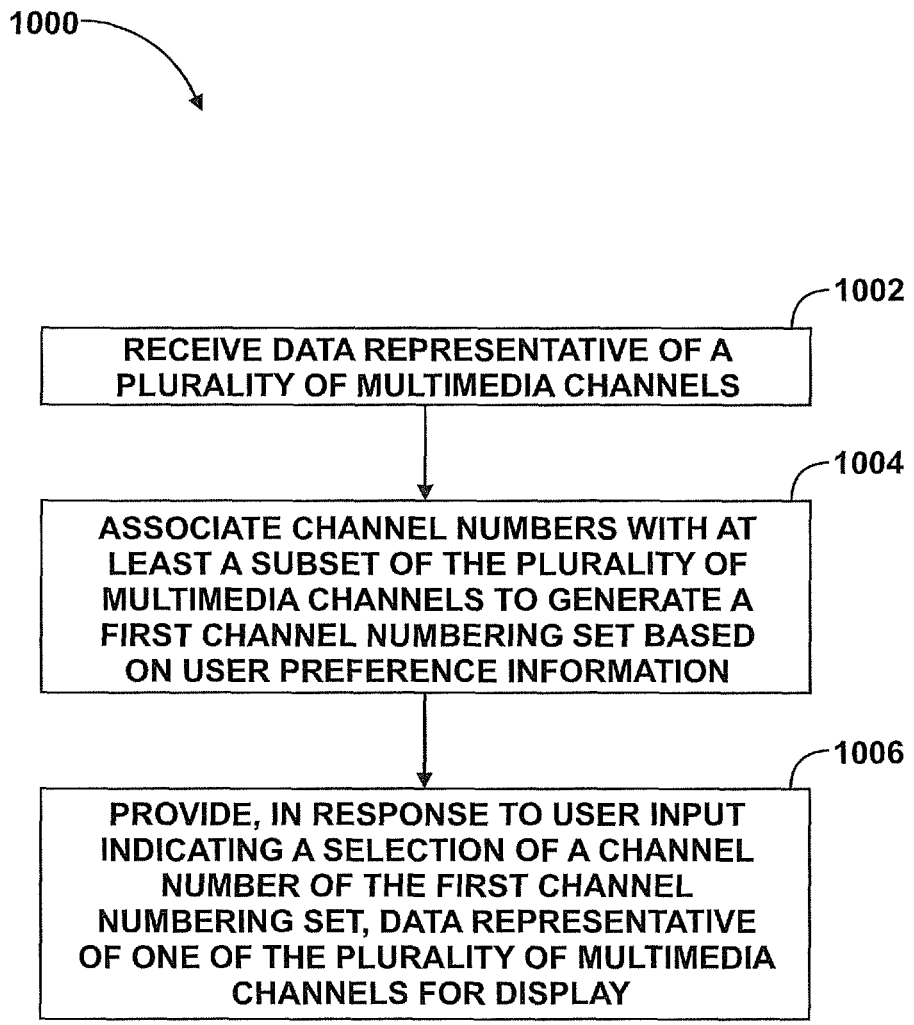
FIGS. 10-13 are flow diagrams illustrating exemplary methods for providing EPGs having reordered channel numbering in accordance with at least one embodiment of the present disclosure.

Referring to FIG. 10, an exemplary method 1000 for providing a multimedia channel for display based on a custom channel numbering arrangement is illustrated in accordance with at least one embodiment of the present disclosure. The method 1000 includes receiving data representative of a plurality of multimedia channels at block 1002. The method 1000 further includes associating channel numbers with at least a subset of the plurality of multimedia channels to generate a first channel numbering set based on user preference information at block 1004. In a particular embodiment, the data representative of the plurality of multimedia channels is received at a set top box with a second channel numbering set that is different than the first channel numbering set. Accordingly, associating a channel number can include changing the channel number associated with the selected multimedia channel from a first channel number to a second channel number. The second channel number can be determined based on user preference information, which may include an indication of a preferred association of a particular multimedia channel with a particular channel number or other channel identifier, an indication of a preferred grouping of channels by genre, and the like. In one embodiment, the first channel numbering set can be represented by an EPG, where the EPG represents a user-defined arrangement of the subset of the plurality of multimedia channels.

The method 1000 further includes providing, in response to user input indicating a selection of a channel number of the first channel numbering set, data representative of one of the plurality of multimedia channels for display at block 1006. In a particular embodiment, providing the data representative of one of the plurality of multimedia channels for display includes receiving user input indicating a selection of a channel number, selecting a multimedia channel of the plurality of multimedia channels based on the selection of the channel number in the first channel numbering set, and providing data representative of the selected multimedia channel for display.

Figure 11:
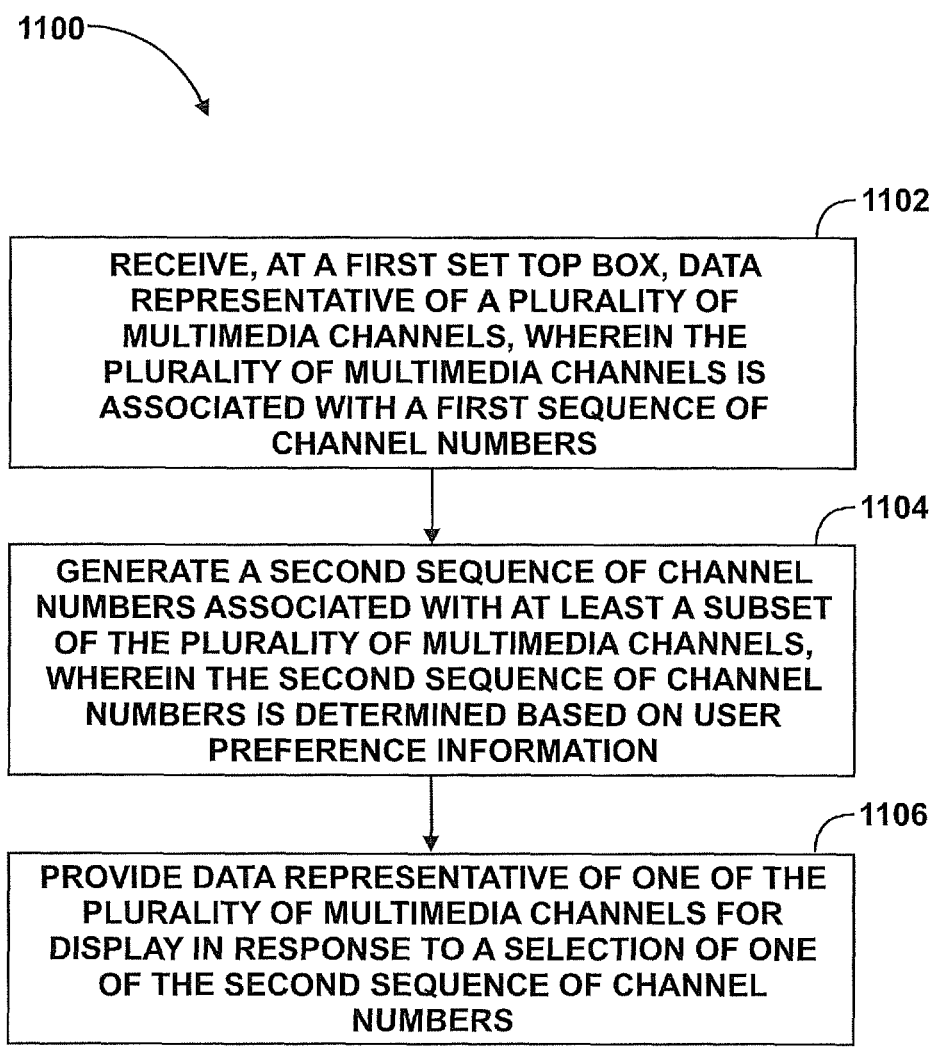

Referring to FIG. 11, an exemplary method 1100 for providing a reordered sequence of channel numbers is illustrated in accordance with at least one embodiment of the present disclosure. The method 1100 includes receiving, at a first set top box, data representative of a plurality of multimedia channels, where the plurality of multimedia channels is associated with a first sequence of channel numbers, at block 1102. The method 1100 also includes generating a second sequence of channel numbers associated with at least a subset of the plurality of multimedia channels, where the second sequence of channel numbers is determined based on user preference information, at block 1104. The method 1100 additionally includes providing data representative of one of the plurality of multimedia channels for display in response to a selection of one of the second sequence of channel numbers at block 1106. In a particular embodiment, the representation of the second sequence of channel numbers can include EPG information and the user preference information can represent a user defined arrangement of at least a subset of the plurality of multimedia channels, where the second sequence of the channel numbers is based on the user defined arrangement.

Figure 12:
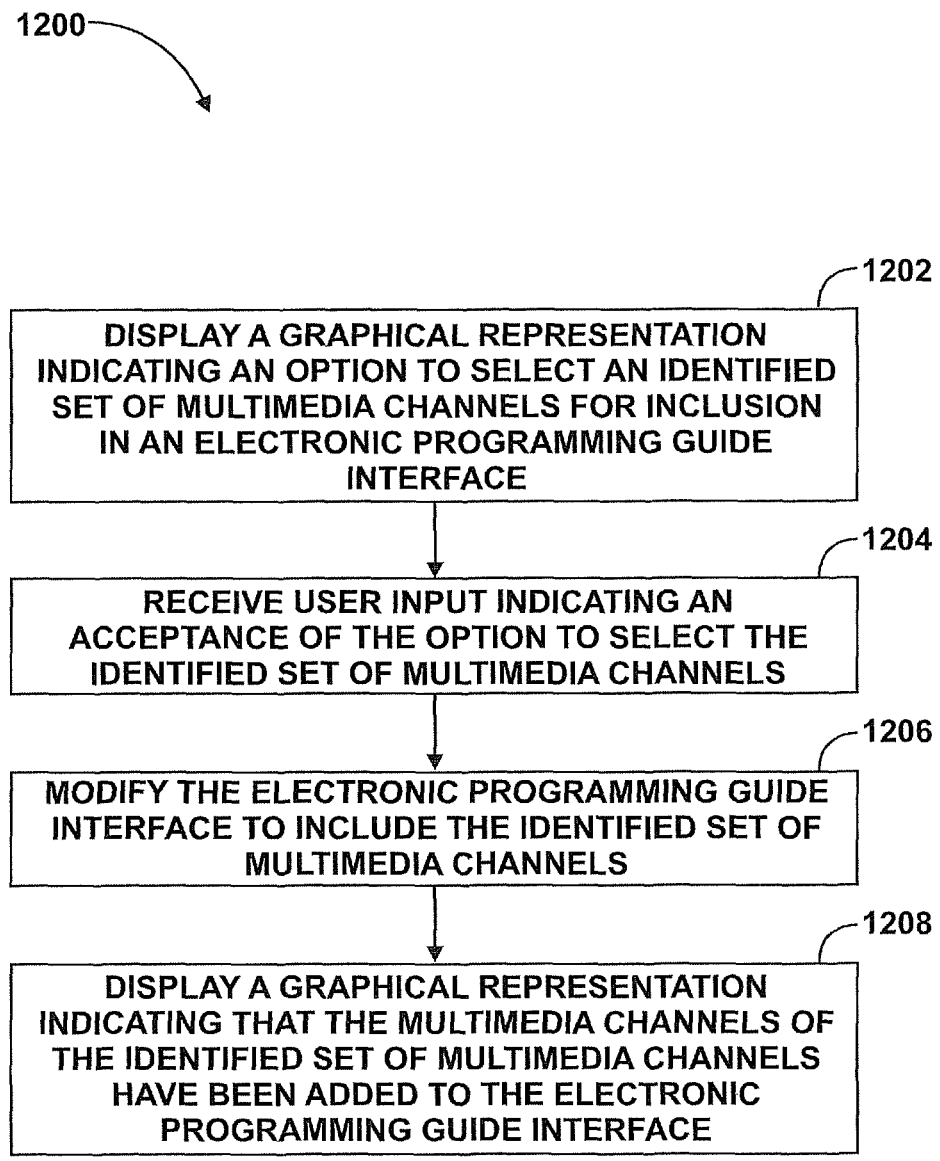

Referring to FIGS. 12-21, exemplary techniques for adding and/or removing channels from an EPG are illustrated in accordance with at least one embodiment of the present disclosure. FIG. 12 illustrates an exemplary method 1200 for adding multimedia channels to an EPG. The method 1200 includes displaying a graphical representation indicating an option to select an identified set of multimedia channels for inclusion in an EPG at block 1202. The method 1200 further includes receiving user input indicating an acceptance of the option to select an identified set of multimedia channels at block 1204 and modifying the EPG interface to include the identified set of multimedia channels at block 1206. In a particular embodiment, the identified set of multimedia channels can include all available multimedia channels. In another embodiment, the identified set of multimedia channels can include multimedia channels associated with an identified programming content category or genre. The method 1200 further includes displaying a graphical representation indicating that the multimedia channels of the identified set of multimedia channels have been added to the EPG interface. For example, the graphical representation can include a dialog box with text indicating that the addition of the selected multimedia channels have been successfully added to the EPG interface.

Figure 13:
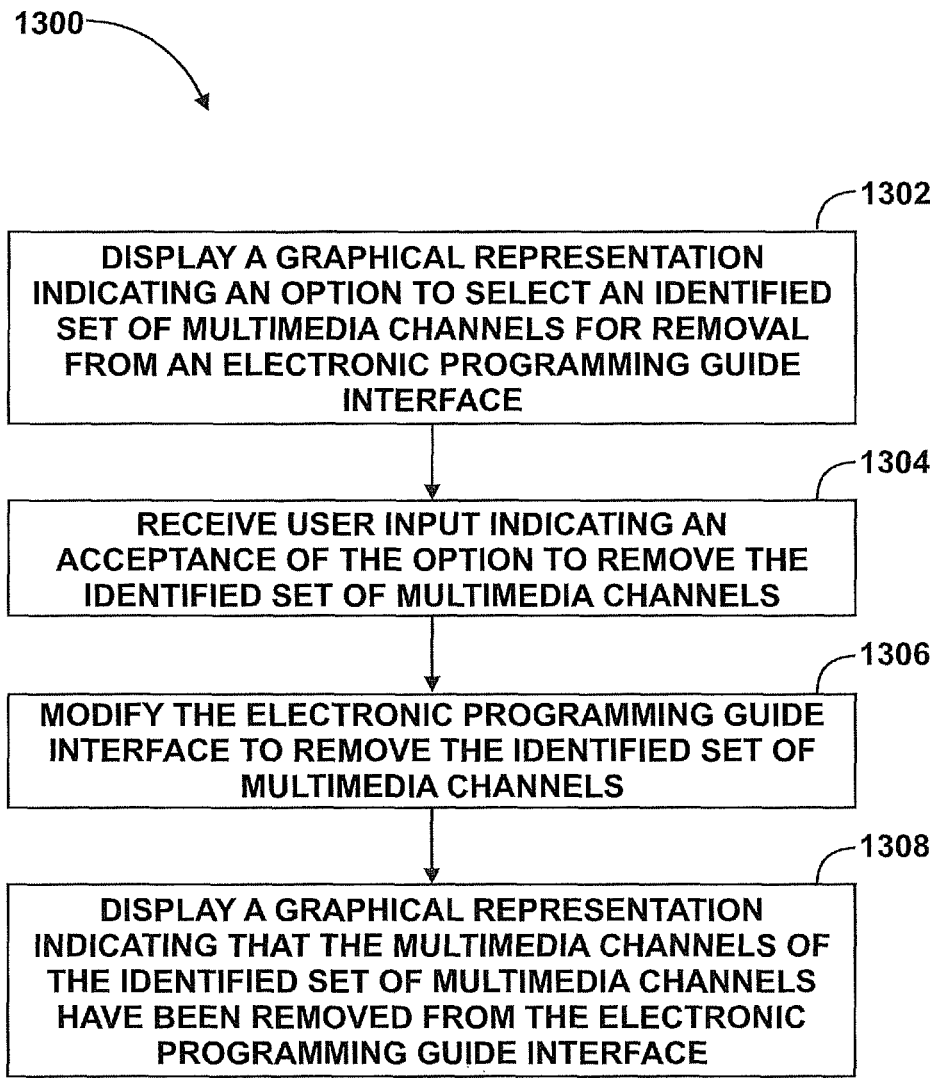

FIG. 13 illustrates an exemplary method 1300 for removing multimedia channels from an EPG interface. The method 1300 includes displaying a graphical representation indicating an option to select an identified set of multimedia channels for removal from the EPG interface at block 1302. The method 1300 further includes receiving user input indicating an acceptance of the option to remove the identified set of multimedia channels at block 1304 and modifying the EPG interface to remove the identified set of multimedia channels at block 1306. In a particular embodiment, the identified set of multimedia channels can include all available multimedia channels. In an alternate embodiment the identified set of multimedia channels can include multimedia channels associated with an identified programming content category or genre. The method 1300 further includes displaying a graphical representation indicating that the multimedia channels of the identified set of multimedia channels have been removed from the electronic programming guide interface at block 1308.

Figure 14:
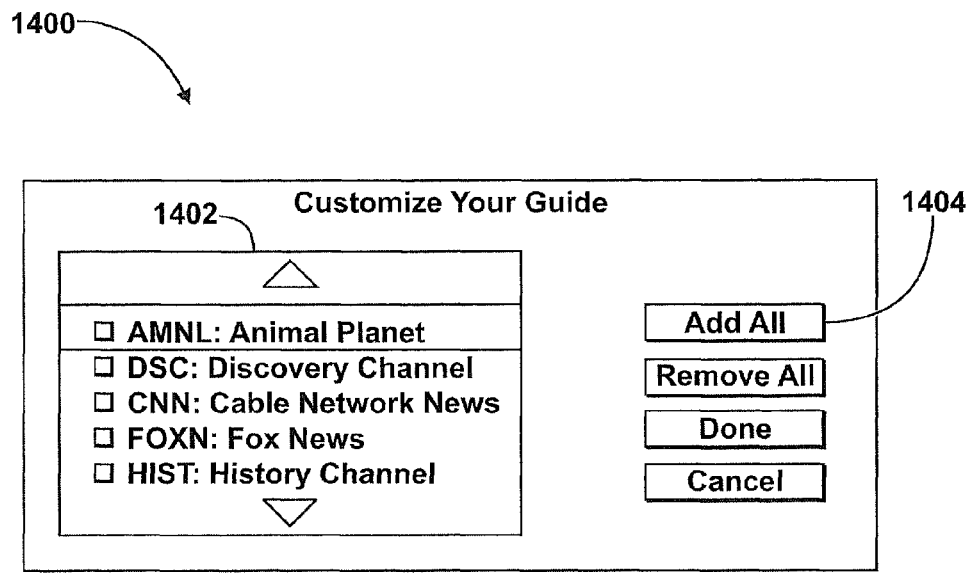
FIGS. 14-21 are block diagrams illustrating exemplary graphical user interfaces (GUIs) for adding or removing channels from an EPG in accordance with at least one embodiment of the present disclosure.
Figure 15:
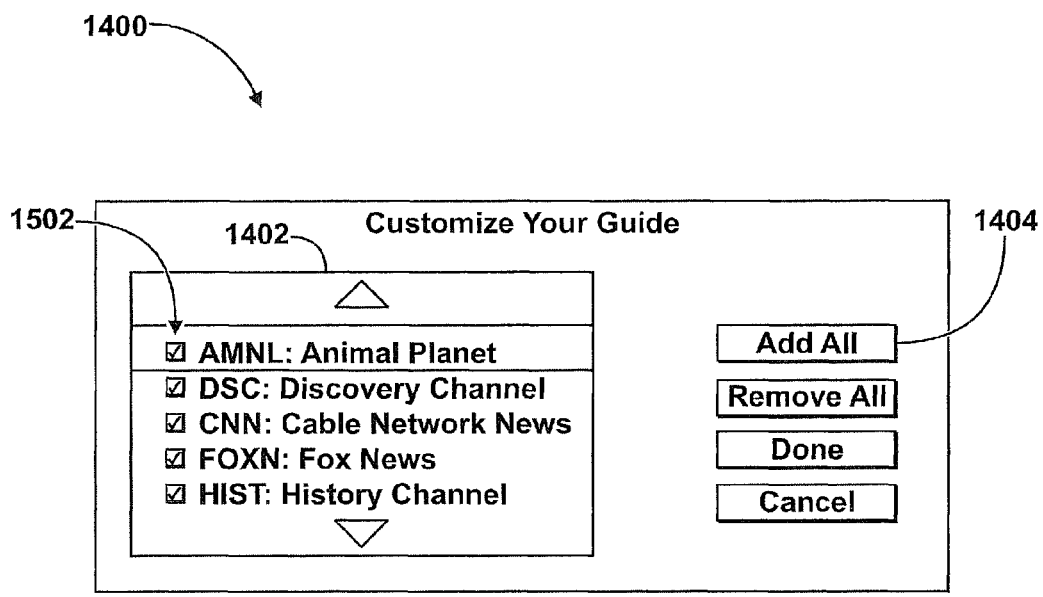

Referring to FIGS. 14 and 15, exemplary graphical displays of an EPG interface for providing the option to add all available multimedia channels to a custom EPG are illustrated in accordance with at least one embodiment of the present disclosure. As shown by FIG. 14, a dialog box 1400 may be displayed as part of an EPG interface, where the dialog box 1400 includes a channel listing 1402 and an "add all" button 1404 representative of an option to add all of the listed multimedia channels to the custom EPG. As shown by FIG. 15, the selection of the "add all" button 1404 results in a selection of all of the listed multimedia channels for inclusion in the custom EPG. A user may be notified of the inclusion of the multimedia channels based on a visual indicator, such as the "checked box" 1502 associated with each of the multimedia channel listings.

Figure 16:
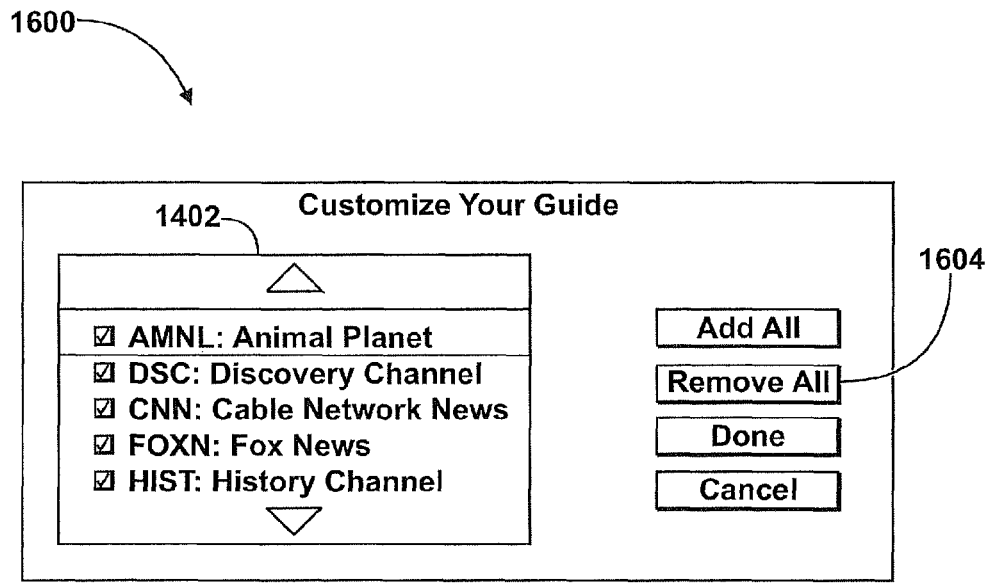
Figure 17:
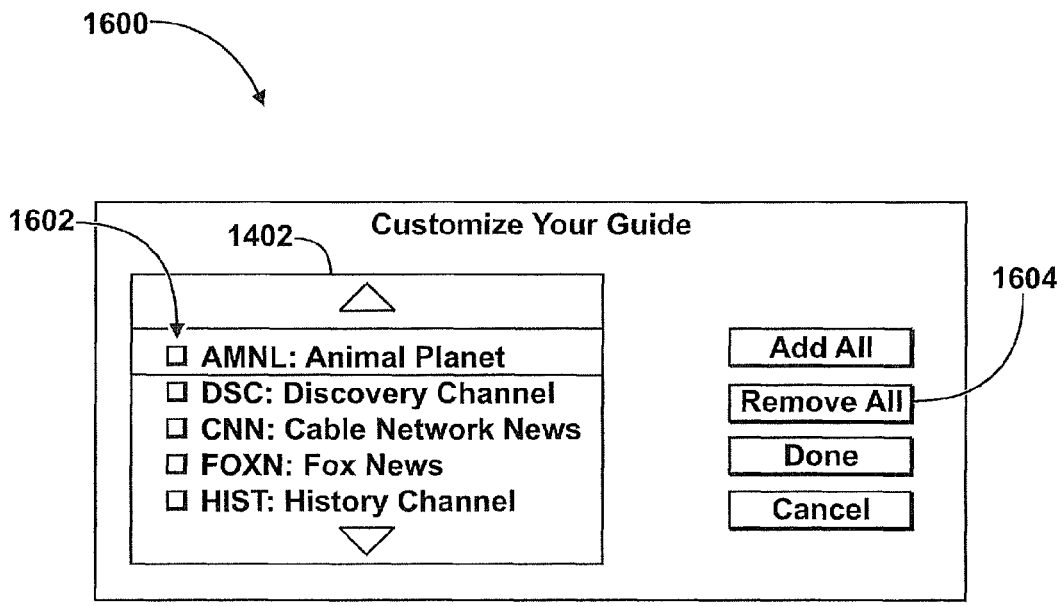

Referring to FIGS. 16 and 17, graphical representations of an EPG interface for removing all available multimedia channels from a custom EPG are illustrated in accordance with at least one embodiment of the present disclosure. As shown by FIG. 16, the EPG interface can include a dialog box 1600 including the channel listing 1402 and a "remove all" button 1604 representative of an option to remove all listed multimedia channels from a custom EPG. As shown by FIG. 17, upon selection of the "remove all" button 1604, the all listed multimedia channels in the channel listing 1402 may be removed from the custom EPG. In one embodiment, the removal of the multimedia channels may be visually indicated using, for example, an "unchecked box" icon 1602 associated with each listed multimedia channel.

Figure 18:
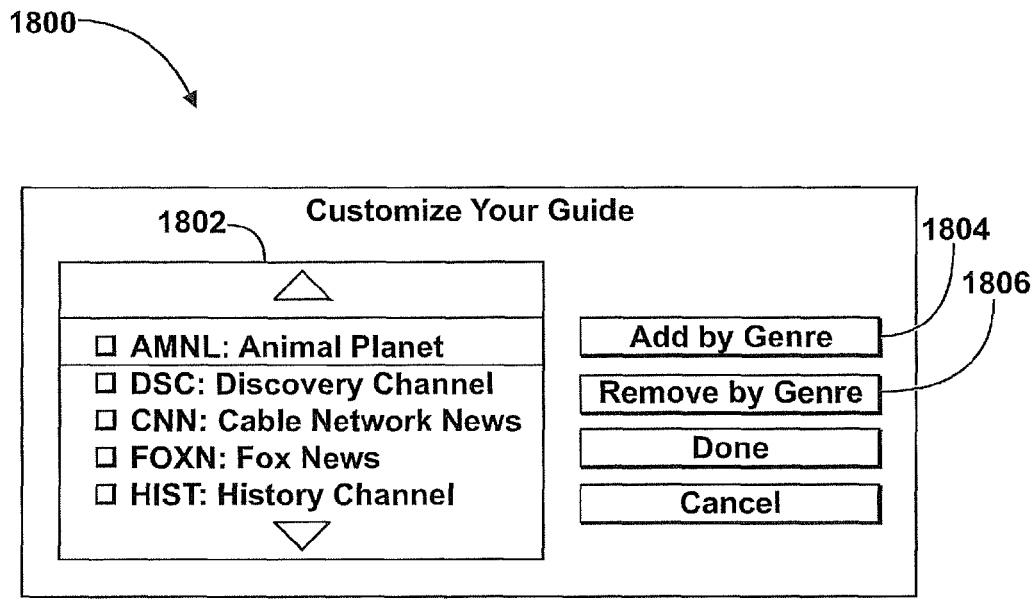
Figure 19:
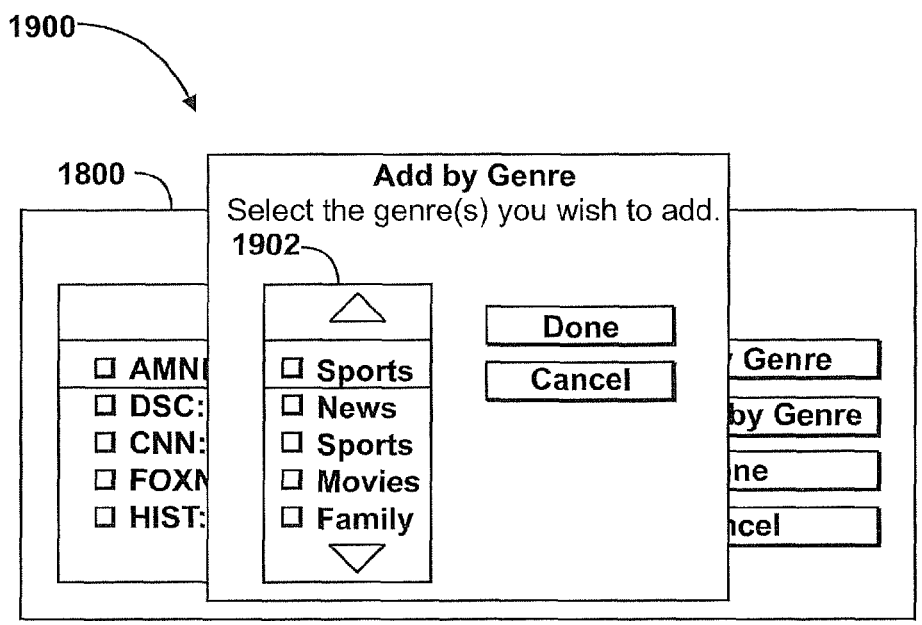
Figure 20:
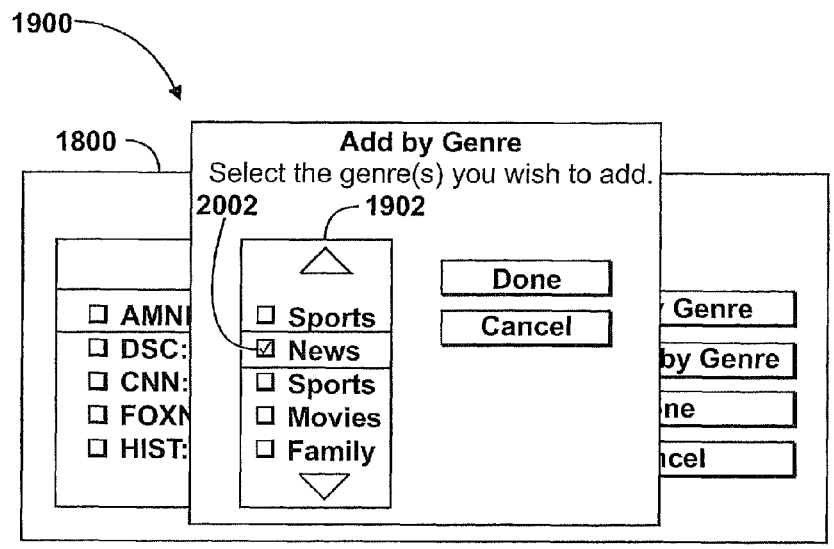
Figure 21:
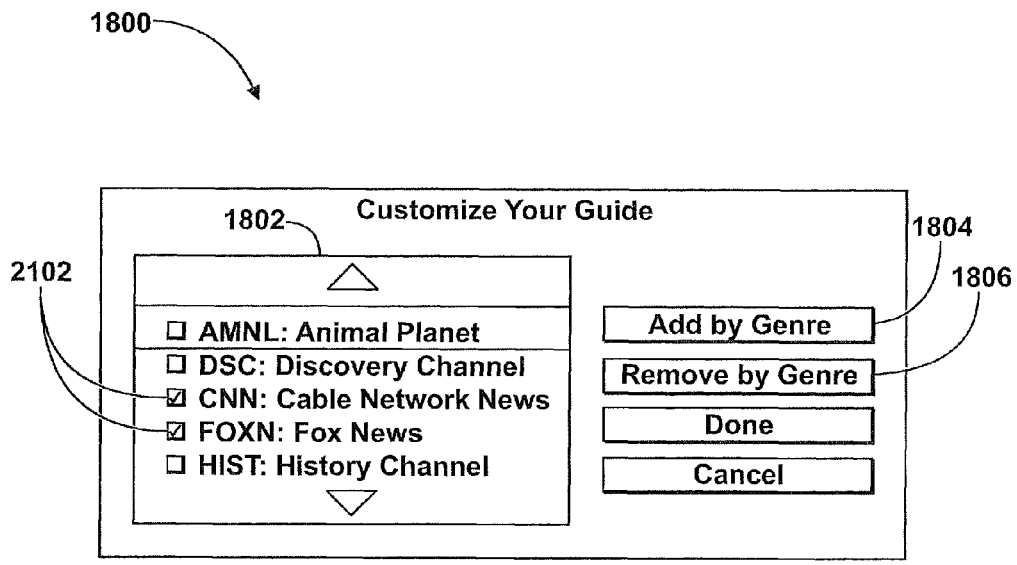

Referring to FIGS. 18-21, graphical representations of an EPG interface for adding multimedia channels to a custom EPG by genre are illustrated in accordance with at least one embodiment of the present disclosure. As shown by FIG. 18, the EPG interface can include a dialog box 1800 including a channel listing 1802 and an "add by genre" button 1804 representative of an option to add multimedia channels to a custom EPG by genre and a "remove by genre" button 1806 representative of an option to remove multimedia channels from a custom EPG by genre. As shown by FIG. 19, upon selection of the "add by genre" button 1804, a dialog box 1900 is displayed, where the dialog box 1900 can include a genre listing 1902 of one or more selectable genres. As shown by FIG. 20, a user can select a particular genre (e.g., a "news" genre) by selecting a check-box feature 2002 or other user-selectable feature of the dialog box 1900 associated with the desired genre. As shown by FIG. 21, the multimedia channels associated with a selected genre are added to the custom EPG and their addition can be verified by a graphical display, such as checked boxes 2102. Multimedia channels may be removed from a custom EPG in a similar manner using the "remove by genre" button 1806 (FIG. 18).

Figure 22:
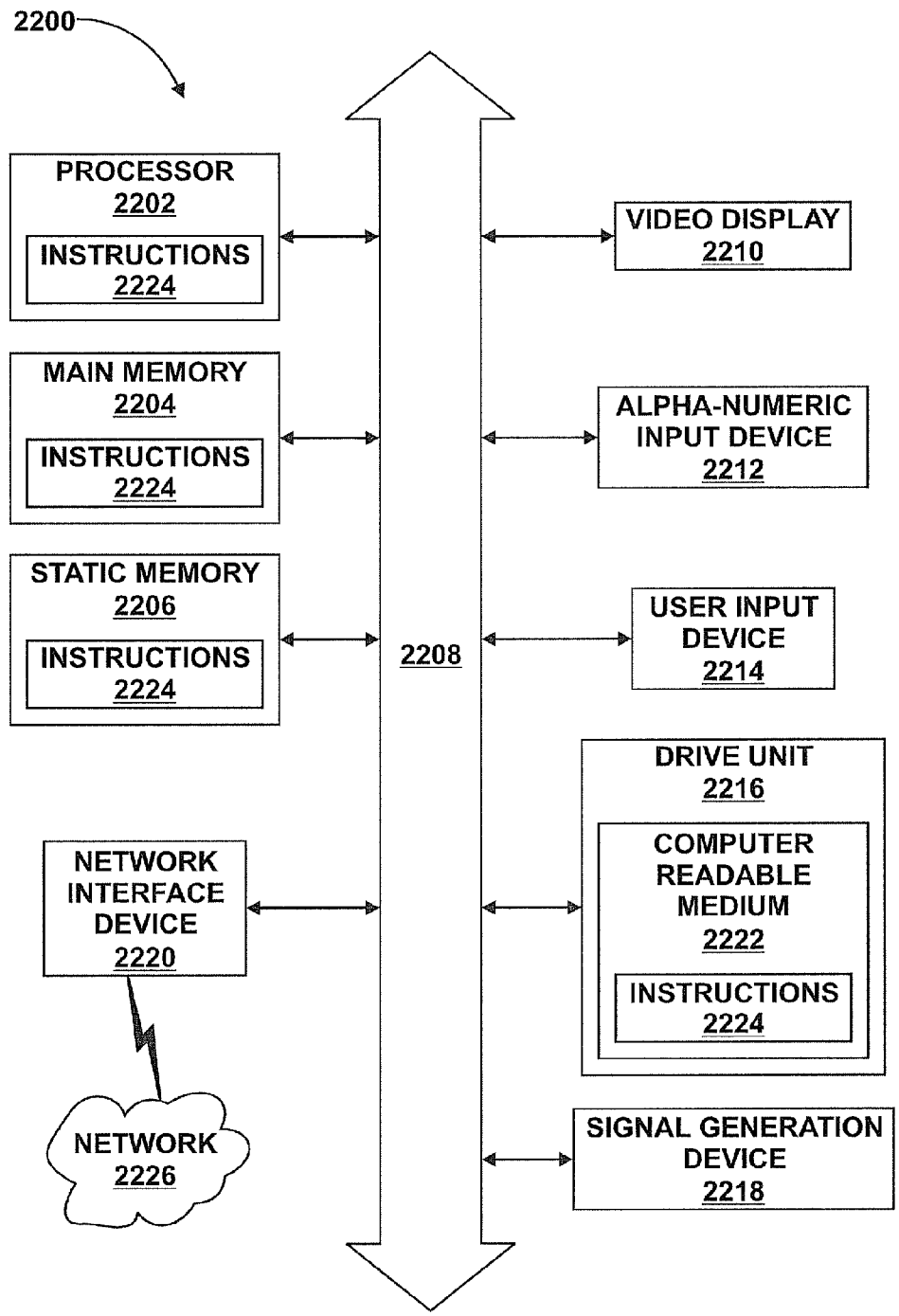
FIG. 22 is a block diagram illustrating an exemplary general computer system for implementing one or more of the techniques of FIGS. 1-21 in accordance with at least one embodiment of the present disclosure.

Referring to FIG. 22, an illustrative embodiment of a computer system is shown and is designated 2200. The computer system 2200 can include a set of instructions that can be executed to cause the computer system 2200 to perform any one or more of the methods or computer based functions disclosed herein. The computer system 2200 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2200 can also be implemented as or incorporated into various devices, such as a set-top box, an Internet Protocol television (IPTV), a personal computer (PC), a tablet PC, a personal digital assistant (PDA), a mobile device, a palmtop computer, a laptop computer, a desktop computer, a communications device, a wireless telephone, a land-line telephone, a control system, a camera, a personal trusted device, a web appliance, a network router, switch or bridge, or any other machine capable of executing a set of instructions (sequential or otherwise) that specify actions to be taken by that machine. In a particular embodiment, the computer system 2200 can be implemented using electronic devices that provide voice, video or data communication. Further, while a single computer system 2200 is illustrated, the term "system" shall also be taken to include any collection of systems or sub-systems that individually or jointly execute a set, or multiple sets, of instructions to perform one or more computer functions.

As illustrated in FIG. 22, the computer system 2200 may include a processor 2202, e.g., a central processing unit (CPU), a graphics processing unit (GPU), or both. Moreover, the computer system 2200 can include a main memory 2204 and a static memory 2206 that communicate via a bus 2208. As shown, the computer system 2200 may further include a video display unit 2210, such as a liquid crystal display (LCD), an organic light emitting diode (OLED), a flat panel display, a solid state display, or a cathode ray tube (CRT). Additionally, the computer system 2200 may include an input device 2212, such as a button pad, and a user input device 2214, such as a remote control input or a video game control. The computer system 2200 can also include a disk drive unit 2216, a signal generation device 2218, such as a speaker or remote control, and a network interface device 2220.

In a particular embodiment, as depicted in FIG. 22, the disk drive unit 2216 may include a computer-readable medium 2222 in which one or more sets of instructions 2224, e.g. software, can be embedded. Further, the instructions 2224 may embody one or more of the methods or logic as described herein. In a particular embodiment, the instructions 2224 may reside completely, or at least partially, within the main memory 2204, the static memory 2206, and/or within the processor 2202 during execution by the computer system 2200. The main memory 2204 and the processor 2202 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 2224 or receives and executes instructions 2224 responsive to a propagated signal, so that a device connected to a network 2226 can communicate voice, video or data over the network 2226. Further, the instructions 2224 may be transmitted or received over the network 2226 via the network interface device 2220.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable memory device including an article, the computer-readable memory device comprising instructions that, when executed by a processor, cause the processor to perform operations including:
   receiving data associated with a plurality of multimedia channels from a multimedia provider, wherein the data includes a multimedia channel numbering set, wherein each multimedia channel of the plurality of multimedia channels is associated with one of a plurality of multimedia content sources, one of a plurality of genres, and a particular multimedia channel number in the multimedia channel numbering set;
   presenting the data via an electronic programming guide, wherein the electronic programming guide includes an option to customize the electronic programming guide by genre;
   in response to a selection of the option to customize the electronic programming guide by genre, receiving selections of a genre and a particular multimedia content source; and
   in response to the selection of the particular multimedia content source, automatically replacing the multimedia channel numbering set with a renumbered multimedia channel numbering set that includes the multimedia channels from the plurality of multimedia content sources that are associated with the genre, and wherein a multimedia channel that is associated with the genre and that is associated with the particular multimedia content source is assigned a lower channel number in the renumbered multimedia channel numbering set than another multimedia channel that is associated with the genre and that is associated with other multimedia content sources.

2. The computer-readable memory device of claim 1, wherein the operations further include storing the renumbered multimedia channel numbering set in logical association with the multimedia channel numbering set received from the multimedia provider.

3. The computer-readable memory device of claim 2, wherein the operations further include generating a display of data representative of a corresponding multimedia channel of the plurality of multimedia channels to display in response to input indicating a selection of a particular channel number of the renumbered multimedia channel numbering set.

4. The computer-readable memory device of claim 1, wherein the particular multimedia content source is an Internet Protocol network-based source and the other multimedia content sources include at least one of a cable television source, a satellite television source, an over the air source, or combinations thereof.

5. The computer-readable memory device of claim 1, wherein the particular multimedia content source is a cable television source and the other multimedia content sources include an Internet Protocol network-based source, a satellite television source, an over the air source, or combinations thereof.

6. The computer-readable memory device of claim 1, wherein the particular multimedia content source is a satellite television source and the other multimedia content sources include a cable television source, an Internet Protocol network-based source, an over the air source, or combinations thereof.

7. The computer-readable memory device of claim 1, wherein the particular multimedia content source is an over the air source and the other multimedia content sources include a cable television source, an Internet Protocol network-based source, a satellite television source, or combinations thereof.

8. The computer-readable memory device of claim 1, wherein operations further include updating the electronic programming guide based on the renumbered multimedia channel numbering set.

9. A set-top box device comprising:
   a processor;
   a plurality of interfaces associated with a plurality of multimedia content sources; and
   a memory coupled to the processor to store a set of instructions that, when executed by the processor, cause the processor to perform operations including:
      receiving data associated with a plurality of multimedia channels, wherein the data includes a multimedia channel numbering set, wherein each multimedia channel of the plurality of multimedia channels is associated with one of the plurality of multimedia content sources, one of a plurality of genres, and a particular multimedia channel number in the multimedia channel numbering set;
      receiving a selection of an option to customize an electronic programming guide by genre;
      receiving selections of a selected genre and a particular multimedia content source of the plurality of multimedia content sources; and
      automatically replacing the multimedia channel numbering set with a renumbered multimedia channel numbering set that includes the multimedia channels from the plurality of multimedia content source that are associated with the selected genre, and wherein one or more multimedia channels that are associated with the selected genre and that are associated with the particular multimedia content source are assigned a lower channel number in the renumbered multimedia channel numbering set than other multimedia channels that are associated with the selected genre and that are associated with other multimedia content sources.

10. The set-top box device of claim 9, wherein the particular multimedia content source is an Internet Protocol network-based source and the other multimedia content sources include a cable television source, a satellite television source, an over the air source, or combinations thereof.

11. The set-top box device of claim 9, wherein the particular multimedia content source is a cable television source and the other multimedia content sources include an Internet Protocol network-based source, a satellite television source, an over the air source, or combinations thereof.

12. The set-top box device of claim 9, wherein the particular multimedia content source is a satellite television source and the other multimedia content sources include a cable television source, an Internet Protocol network-based source, an over the air source, or combinations thereof.

13. The set-top box device of claim 9, wherein the particular multimedia content source is an over the air source and the other multimedia content sources include a cable television source, an Internet Protocol network-based source, a satellite television source, or combinations thereof.

14. The set-top box device of claim 9, wherein the instructions further comprise instructions that, when executed by the processor, cause the processor to store information associated with the selected genre and the particular multimedia content source as user preference information.

15. A method comprising:
receiving data associated with a plurality of multimedia channels from a multimedia provider at a set-top box device, wherein the data includes a multimedia channel numbering set, wherein each multimedia channel of the plurality of multimedia channels is associated with one of a plurality of multimedia content sources, one of a plurality of genres, and a particular multimedia channel number in the multimedia channel numbering set;
presenting the data at a display device communicatively coupled to the set-top box device via an electronic programming guide, wherein the electronic programming guide includes an option to customize the electronic programming guide by genre;
in response to a selection of the option to customize the electronic programming guide by genre, receiving selections of a genre and a particular multimedia content source; and
in response to the selection of the particular multimedia content source, automatically replacing the multimedia channel numbering set with a renumbered multimedia channel numbering set that includes the multimedia channels from the plurality of multimedia content sources that are associated with the genre, and wherein one or more multimedia channels that are associated with the genre and that are associated with the particular multimedia content source are assigned a lower channel number in the renumbered multimedia channel numbering set than other multimedia channels that are associated with the genre and that are associated with other multimedia content sources.

16. The method of claim 15, wherein the particular multimedia content source is an Internet Protocol network-based source and the other multimedia content sources include a cable television source, a satellite television source, an over the air source, or combinations thereof.

17. The method of claim 15, wherein the particular multimedia content source is a cable television source and the other multimedia content sources include an Internet Protocol network-based source, a satellite television source, an over the air source, or combinations thereof.

18. The method of claim 15, wherein the particular multimedia content source is a satellite television source and the other multimedia content sources include a cable television source, an Internet Protocol network-based source, an over the air source, or combinations thereof.

19. The method of claim 15, wherein the particular multimedia content source is an over the air source and the other multimedia content sources include a cable television source, an Internet Protocol network-based source, a satellite television source, or combinations thereof.

20. The method of claim 15, wherein the plurality of genres includes a sports genre, a news genre, a movies genre, and a family genre.

* * * * *